United States Patent
Kakehi

(10) Patent No.: US 11,276,305 B2
(45) Date of Patent: Mar. 15, 2022

(54) SYSTEM FOR PREDICTING ROAD SURFACE FRICTION COEFFICIENT

(71) Applicant: JTEKT CORPORATION, Osaka (JP)

(72) Inventor: Satomi Kakehi, Toyota (JP)

(73) Assignee: JTEKT CORPORATION, Osaka (JP)

( * ) Notice: Subject to any disclaimer, the term of this patent is extended or adjusted under 35 U.S.C. 154(b) by 144 days.

(21) Appl. No.: 16/883,372

(22) Filed: May 26, 2020

(65) Prior Publication Data
US 2020/0380862 A1  Dec. 3, 2020

(30) Foreign Application Priority Data

May 27, 2019 (JP) .............................. JP2019-098820
May 27, 2019 (JP) .............................. JP2019-098821
May 27, 2019 (JP) .............................. JP2019-098822
Oct. 23, 2019 (JP) .............................. JP2019-192886

(51) Int. Cl.
*B60T 8/32* (2006.01)
*G08G 1/0967* (2006.01)
(Continued)

(52) U.S. Cl.
CPC ... *G08G 1/096775* (2013.01); *B60C 23/0488* (2013.01); *B60W 40/068* (2013.01);
(Continued)

(58) Field of Classification Search
CPC ........... G08G 1/096775; G08G 1/0129; G08G 1/0141; G08G 1/096716; G08G 1/096741; G08G 1/09675; G08G 1/0112; B60C 23/0488; B60W 40/068; B60W 2552/05; B60W 2555/20; B60W 2556/45;
(Continued)

(56) References Cited

U.S. PATENT DOCUMENTS 10,442,439 B1 * 10/2019 Seo ........................ B60W 40/00
2007/0142996 A1 * 6/2007 Lee ........................ B60W 30/16
701/96

(Continued)

FOREIGN PATENT DOCUMENTS

| JP | 2009-92221 A | 4/2009 |
| JP | 2015-51704 A | 3/2015 |
| JP | 2018-4417 A | 1/2018 |

*Primary Examiner* — Munear T Akki
(74) *Attorney, Agent, or Firm* — Oblon, McClelland, Maier & Neustadt, L.L.P.

(57) ABSTRACT

A system for predicting a road surface friction coefficient includes an external information acquisition part, a tire information acquisition part, and a friction coefficient prediction part. The external information acquisition part configured to acquire external information on a disturbance factor that affects a condition of a road surface on which a target vehicle travels. The tire information acquisition part configured to acquire tire information indicating a condition of a tire of the target vehicle. The friction coefficient prediction part configured to predict a friction coefficient between the tire and the road surface based on the tire information acquired by the tire information acquisition part and the external information acquired by the external information acquisition part. The friction coefficient prediction part predicts a friction coefficient of a road surface ahead of the target vehicle in a traveling direction.

3 Claims, 22 Drawing Sheets

(51) Int. Cl.
*B60W 40/068* (2012.01)
*B60C 23/04* (2006.01)
*G01S 19/42* (2010.01)
*G07C 5/08* (2006.01)
*G07C 5/02* (2006.01)

(52) U.S. Cl.
CPC ............ *G01S 19/42* (2013.01); *G07C 5/0808* (2013.01); *G07C 5/0816* (2013.01); *B60W 2552/05* (2020.02); *B60W 2555/20* (2020.02); *B60W 2556/45* (2020.02); *G07C 5/02* (2013.01)

(58) Field of Classification Search
CPC ....... B60W 40/00; B60W 40/06; G01S 19/42; G07C 5/0808; G07C 5/0816; G07C 5/02; G07C 5/008; B60T 2210/12; B60T 2210/36; H04W 4/38; H04W 4/40; H04L 67/12; H04L 67/18
See application file for complete search history.

(56) References Cited

U.S. PATENT DOCUMENTS

| | | | |
|---|---|---|---|
| 2009/0099739 A1 | 4/2009 | Hara | |
| 2015/0251659 A1* | 9/2015 | Fischer | B60T 8/1725 |
| | | | 382/104 |
| 2016/0133131 A1* | 5/2016 | Grimm | G08G 1/096725 |
| | | | 701/117 |
| 2017/0101095 A1* | 4/2017 | Nilsson | B60T 7/22 |
| 2017/0236052 A1* | 8/2017 | Israelsson | G08G 1/0129 |
| | | | 706/21 |
| 2019/0047527 A1* | 2/2019 | Falconer | B60W 10/06 |
| 2019/0212138 A1 | 7/2019 | Hanatsuka et al. | |
| 2020/0255020 A1* | 8/2020 | Simmons | G08G 1/0116 |

* cited by examiner

Fig. 5

| VEHICLE ID | VEHICLE TYPE | POSITION INFORMATION | | ROAD STATE | ROAD SURFACE CONDITION | FRICTION COEFFICIENT $\mu$ | TIRE CONDITION COEFFICIENT |
|---|---|---|---|---|---|---|---|
| A | XXX | NORTH LATITUDE<br>EAST LONGITUDE | 21.°..'..."<br>130.°..'..." | PAVED | DRY | 0.93 | 0.88 |
| B | YYY | NORTH LATITUDE<br>EAST LONGITUDE | 21.°..'..."<br>130.°..'..." | UNPAVED | DRY | 0.78 | 0.80 |
| C | XXX | NORTH LATITUDE<br>EAST LONGITUDE | 21.°..'..."<br>130.°..'..." | PAVED | WET | 0.55 | 0.90 |
| D | ZZZ | NORTH LATITUDE<br>EAST LONGITUDE | 21.°..'..."<br>130.°..'..." | PAVED | SNOW | 0.34 | 0.72 |

| VEHICLE ID | VEHICLE TYPE | POSITION INFORMATION | | ROAD STATE | ROAD SURFACE CONDITION | PREDICTED FRICTION COEFFICIENT | TIRE CONDITION COEFFICIENT |
|---|---|---|---|---|---|---|---|
| A | XXX | NORTH LATITUDE | 21.°,',"..." | PAVED | DRY | 0.93 | 0.88 |
| | | EAST LONGITUDE | 130.°,',"..." | | | | |
| B | YYY | NORTH LATITUDE | 21.°,',"..." | UNPAVED | DRY | 0.78 | 0.80 |
| | | EAST LONGITUDE | 130.°,',"..." | | | | |
| C | XXX | NORTH LATITUDE | 21.°,',"..." | PAVED | WET | 0.55 | 0.90 |
| | | EAST LONGITUDE | 130.°,',"..." | | | | |
| D | ZZZ | NORTH LATITUDE | 21.°,',"..." | PAVED | SNOW | 0.34 | 0.72 |
| | | EAST LONGITUDE | 130.°,',"..." | | | | |

| VEHICLE ID | VEHICLE TYPE | POSITION INFORMATION | ROAD STATE | ROAD SURFACE CONDITION | FRICTION COEFFICIENT $\mu$ | SLIP RATIO | COMMAND TORQUE |
|---|---|---|---|---|---|---|---|
| A | XXX | NORTH LATITUDE 21.'." EAST LOGITUDE 130.'." | PAVED | DRY | eee | sss | aaa |
| B | YYY | NORTH LATITUDE 21.'." EAST LOGITUDE 130.'." | UNPAVED | DRY | fff | ttt | bbb |
| C | XXX | NORTH LATITUDE 21.'." EAST LOGITUDE 130.'." | PAVED | WET | ggg | uuu | ccc |
| D | ZZZ | NORTH LATITUDE 21.'." EAST LOGITUDE 130.'." | PAVED | SNOW | hhh | ppp | ddd |

SYSTEM FOR PREDICTING ROAD SURFACE FRICTION COEFFICIENT

CROSS REFERENCE TO RELATED APPLICATIONS

This application claims priority to Japanese Patent Application No. 2019-098820 filed on May 27, 2019, Japanese Patent Application No. 2019-098821 filed on May 27, 2019, Japanese Patent Application No. 2019-098822 filed on May 27, 2019, and Japanese Patent Application No. 2019-192886 filed on Oct. 23, 2019, the contents of which is incorporated herein by reference.

BACKGROUND

Field of the Invention

The present disclosure relates to a system for predicting a friction coefficient of a road surface.

Related Art

A system for predicting a road surface friction coefficient described in JP-2018-004417-A predicts a friction coefficient of a road surface based on a state of a tire of a vehicle. The system includes a vibration detection means configured to detect vibration of a tire during traveling, a vibration waveform detection means configured to detect a time-varying waveform of the vibration of the tire, a road surface state determination means configured to determine a state of the road surface from the time-varying waveform, and a tire state detection means configured to acquire state information of the tire. The road surface state determination means determines the state of the road surface based on a determination parameter for determining the state of the road surface obtained from the vibration waveform and the state information of the tire. This configuration can provide accurate determination of the state of the road surface even when the state of the tire changes.

However, the system, determining the state of the road surface based on the vibration of the traveling tire, may have difficulties in predicting the friction coefficient of the road surface accurately when the state of the road surface changes during traveling.

SUMMARY

Illustrative aspects of the present disclosure provide a system capable of accurately predicting a friction coefficient of a road surface even when a state of a road surface changes.

According to an aspect of the present disclosure, a system for predicting a road surface friction coefficient includes an external information acquisition part, a tire information acquisition part, and a friction coefficient prediction part. The external information acquisition part configured to acquire external information on a disturbance factor that affects a condition of a road surface on which a target vehicle travels. The tire information acquisition part configured to acquire tire information indicating a condition of a tire of the target vehicle. The friction coefficient prediction part configured to predict a friction coefficient between the tire and the road surface based on the tire information acquired by the tire information acquisition part and the external information acquired by the external information acquisition part.

The friction coefficient prediction part predicts a friction coefficient of a road surface ahead of the target vehicle in a traveling direction.

BRIEF DESCRIPTION OF THE DRAWINGS

FIG. 5 is a table illustrating collected data collected by the information collection server shown in FIG. 1;

FIG. 11 is a table illustrating collected data collected by the information collection server;

FIG. 16 is a table illustrating collected data collected by an information collection server shown in FIG. 13;

DETAILED DESCRIPTION OF THE EXEMPLARY EMBODIMENTS

First Embodiment

A first embodiment of the present disclosure will be described with reference to FIGS. 1 to 6. It should be noted that the embodiments described below are given as preferred specific examples for carrying out the present disclosure, and various technically preferable technical matters are specifically exemplified, but the technical scope of the present disclosure is not limited to this specific embodiments.

Figure 1:
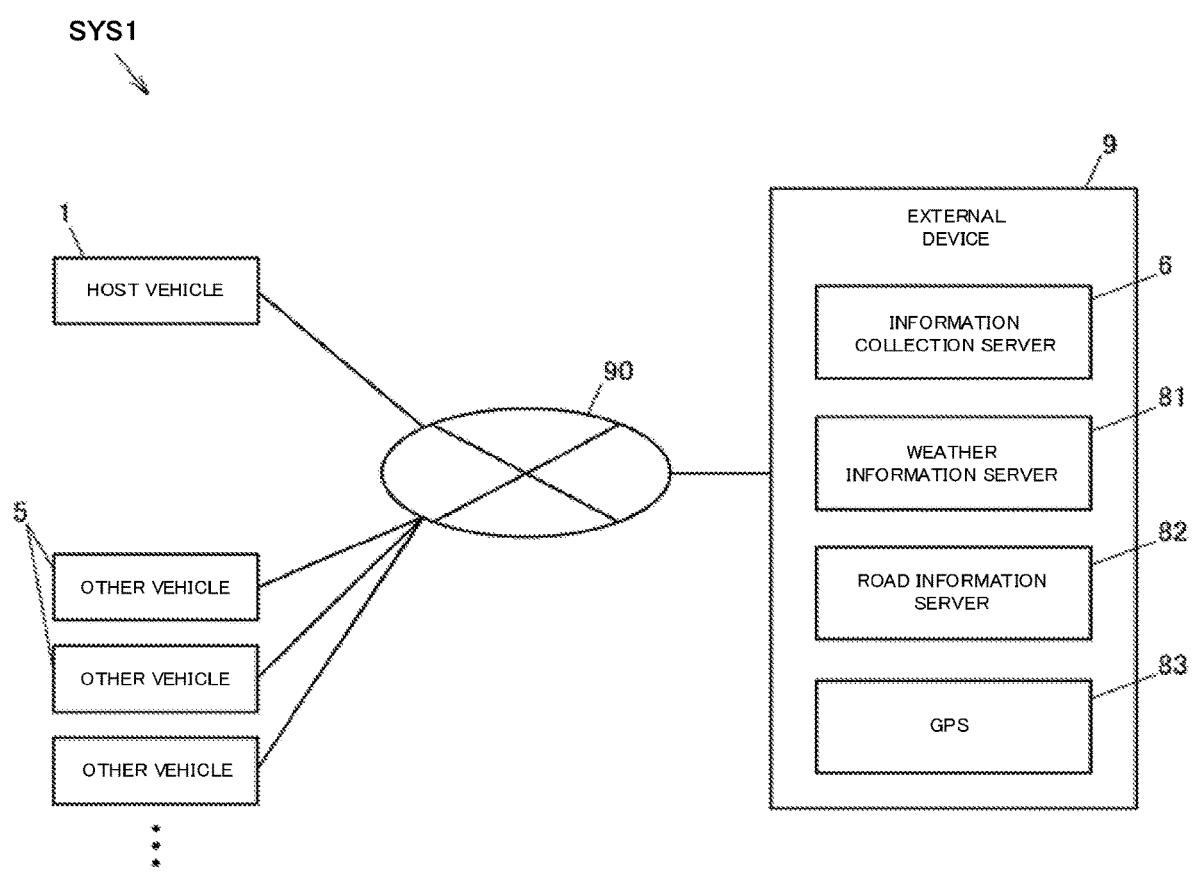
FIG. 1 is a block diagram illustrating an overall configuration of a system for determining a tire state according to an embodiment of the present disclosure.

FIG. 1 is a block diagram illustrating an overall schematic configuration of a system for determining a tire state according to the first embodiment of the present disclosure.

As shown in FIG. 1, a system SYS1 for determining a tire state includes a host vehicle 1 serving as a determination target of a tire state, a plurality of other vehicles 5, and an external device 9 communicably connected to the host vehicle 1 and the plurality of other vehicles 5 via a wireless communication network 90.

In the present embodiment, although the host vehicle 1 is distinguished from the plurality of other vehicles 5 for convenience of description, the plurality of other vehicles 5 may be the determination targets of the tire state, and the host vehicle 1 and the plurality of other vehicles 5 each correspond to a "target vehicle" in the present disclosure. A vehicle type, a model year, a model type, or the like of the host vehicle 1 and the plurality of other vehicles 5 are optional, and are not limited.

The external device 9 includes an information collection server 6 for collecting vehicle information transmitted by the host vehicle 1 and the plurality of other vehicles 5, a weather information server 81, a road information server 82, and a global positioning system (GPS) 83.

The weather information server 81 is a server that provides weather information throughout Japan acquired from weather stations in various places or the like. The road information server 82 is a server that provides information indicating a road state (for example, a paved road or the like) corresponding to the current position on which the vehicle travels. The weather information provided by the weather information server 81 and the road information provided by the road information server 82 are examples of disturbance factors that affect a condition of the road surface on which the vehicle travels.

Figure 2:
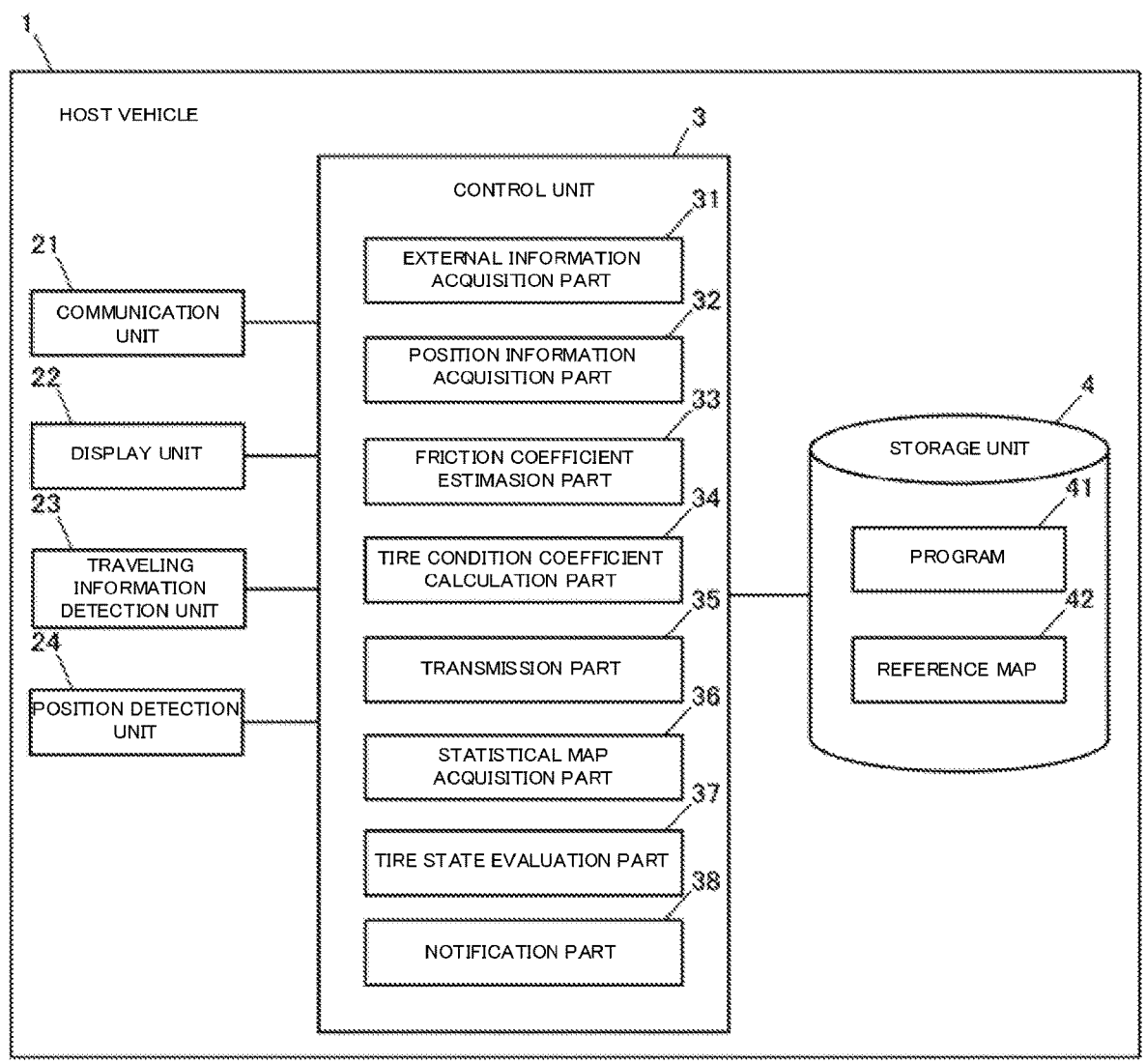
FIG. 2 is a block diagram illustrating a configuration of a host vehicle shown in FIG. 1.
Figure 3:
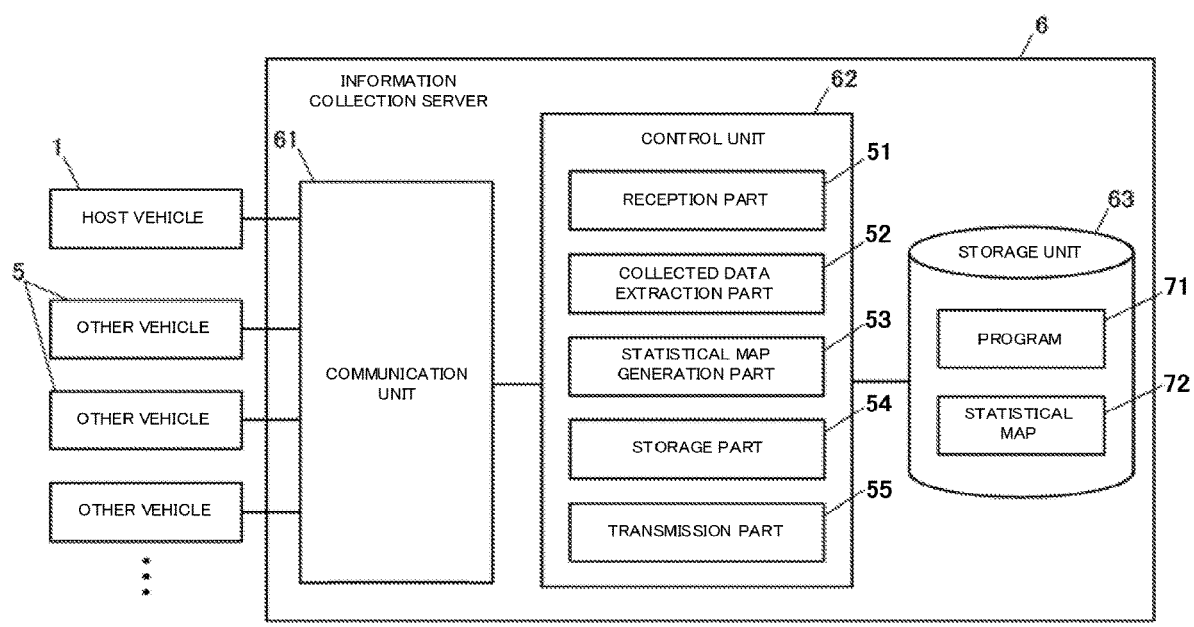
FIG. 3 is a block diagram illustrating a configuration of an information collection server shown in FIG. 1.

FIG. 2 is a block diagram illustrating a configuration of the host vehicle 1. FIG. 3 is a block diagram illustrating a configuration of the information collection server 6 of the external device 9. As shown in FIG. 2, the host vehicle 1 includes a communication unit 21 that transmits and receives information to and from the plurality of other vehicles 5 and the external device 9, a control unit 3 that controls the host vehicle 1, a display unit 22 that displays information output from the control unit 3, a traveling information detection unit 23 that detects information on a traveling state of the host vehicle 1, a position detection unit 24 that detects the current position of the host vehicle 1 based on a satellite signal from the GPS 83, and a storage unit 4 including a storage element such as a read only memory (ROM) or a random access memory (RAM). The plurality of other vehicles 5 have the same configuration as that of the host vehicle 1.

The communication unit 21 is an electronic control device that transmits and receives information by communicating with a communication target other than the host vehicle 1 via the wireless communication network 90. The communication unit 21 includes a communication module such as a data communication module (DCM).

The display unit 22 displays information output from the control unit 3. The display unit 22 is, for example, a display such as a liquid crystal display or an organic electroluminescent display, and may function as a display unit of a car navigation system or may be provided in a console panel of a vehicle.

The traveling information detection unit 23 includes a plurality of sensors that acquire parameters related to the traveling state of the host vehicle 1 such as a vehicle speed sensor for acquiring a vehicle speed, and a steering angle sensor.

The position detection unit 24 acquires position information indicating the current position of the host vehicle 1, and is a GPS receiver that acquires the current position information (longitude, latitude, or the like) of the host vehicle 1 using a satellite positioning system.

The control unit 3 includes a central processing unit (CPU) and a peripheral circuit thereof. The control unit 3 executes a program 41 stored in the storage unit 4 to perform a function of each part such as a friction coefficient estimation part 33 to be described later.

The control unit 3 includes an external information acquisition part 31, a position information acquisition part 32, the friction coefficient estimation part 33, a tire condition coefficient calculation part 34, a transmission part 35, a statistical map acquisition part 36, a tire state evaluation part 37, and a notification part 38.

The external information acquisition part 31 estimates a road surface condition based on the weather information provided by the weather information server 81 of the external device 9. For example, the external information acquisition part 31 estimates that the road surface condition is dry when the weather information is fine, and the external information acquisition part 31 estimates that the road surface condition is wet when the weather information is rain. In addition, the external information acquisition part 31 acquires information indicating the road state (the paved road or an unpaved road) based on the road information provided by the road information server 82.

The position information acquisition part 32 acquires the position information generated by the position detection unit 24.

The friction coefficient estimation part 33 estimates a friction coefficient between the tire of the vehicle and the road surface based on the traveling information on the traveling state of the vehicle detected by the traveling information detection unit 23. The friction coefficient can be estimated on the basis of a difference between an average rotation speed of left and right front wheels and an average rotation speed of left and right rear wheels in a steady traveling state, for example.

The tire condition coefficient calculation part 34 calculates a tire condition coefficient by comparing the estimated friction coefficient estimated by the friction coefficient estimation part 33 with a reference friction coefficient indicating slipperiness of the tire according to the road surface condition.

The reference friction coefficient can be obtained by referring to, for example, a reference map 42 (shown in FIG. 4A) stored in the storage unit 4 in advance. The reference map 42 includes the reference friction coefficient set for each road surface condition (dry, wet, snow), and is, for example, a value of the reference friction coefficient is determined by performance evaluation at the time of shipment from a factory. The tire condition coefficient calculation part 34 acquires the reference friction coefficient from the reference map 42 based on the road surface condition determined by the external information acquisition part 31. The reference friction coefficient may be set for each road state. This provides the reference friction coefficient according to more detailed road surface condition.

Here, the tire condition coefficient is an index value that affects the slipperiness of the vehicle due to a tire state (tire wear, an air pressure, or the like), and can be obtained, for example, as a ratio of the estimated friction coefficient to the reference friction coefficient (the tire condition coefficient=the estimated friction coefficient/the reference friction coefficient). That is, the larger the value of the tire condition coefficient is, the more difficult to slip the tire state of the traveling vehicle is.

The transmission part 35 transmits information indicating the slipperiness of the tire to the information collection server 6 by the communication unit 21. In the present embodiment, the transmission part 35 generates transmission data based on the friction coefficient estimated by the friction coefficient estimation part 33, the tire condition coefficient calculated by the tire condition coefficient calculation part 34, the vehicle information (a vehicle ID, a vehicle type, a vehicle speed, or the like) on the host vehicle 1, the position information, the road state, and the road surface condition. Then the transmission part 35 transmits the transmission data to the information collection server 6 of the external device 9. This transmission data corresponds to a part of collected data 60 collected by the information collection server 6.

The information collection server 6 receives data similar to the transmission data transmitted by the transmission part 35 from the plurality of other vehicles 5, and collects the received data as the collected data 60. FIG. 5 is a table illustrating the collected data 60. As shown in FIG. 5, the collected data 60 includes, as items, the vehicle ID for identifying the vehicle, information on the vehicle type of the vehicle, the position information indicating the current position at which the vehicle travels, the road state and the road surface condition at a position indicated by the position information, and the friction coefficient and the tire condition coefficient calculated for each vehicle. Note that the items of the collected data 60 are not limited, and the collected data 60 may include, for example, information such as a measurement date and time, a traveling distance as items.

Figure 4A:
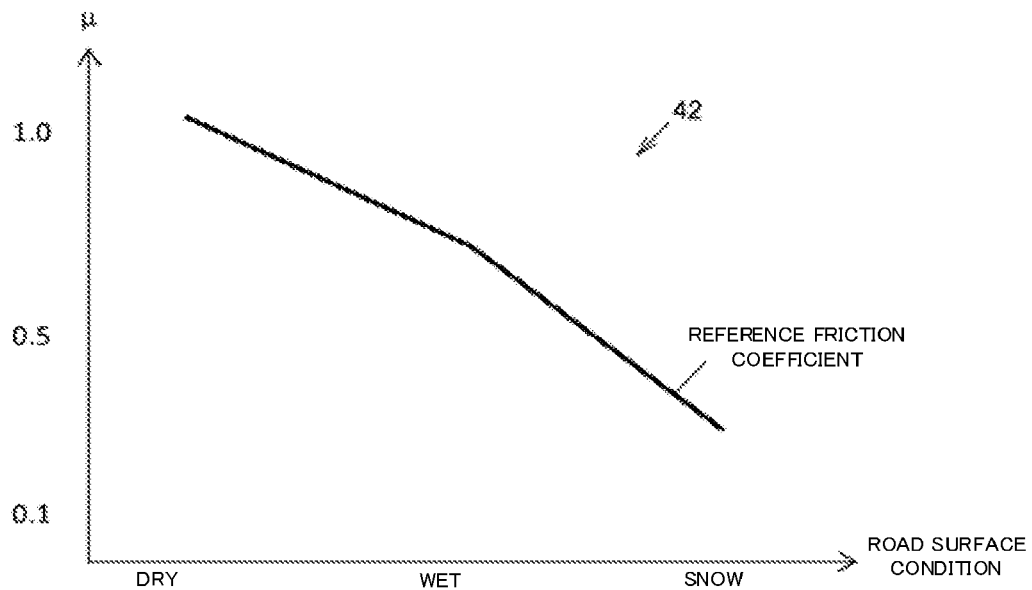
FIG. 4A is a graph illustrating a reference map that shows a relationship between a condition of a road surface and a friction coefficient.
Figure 4B:
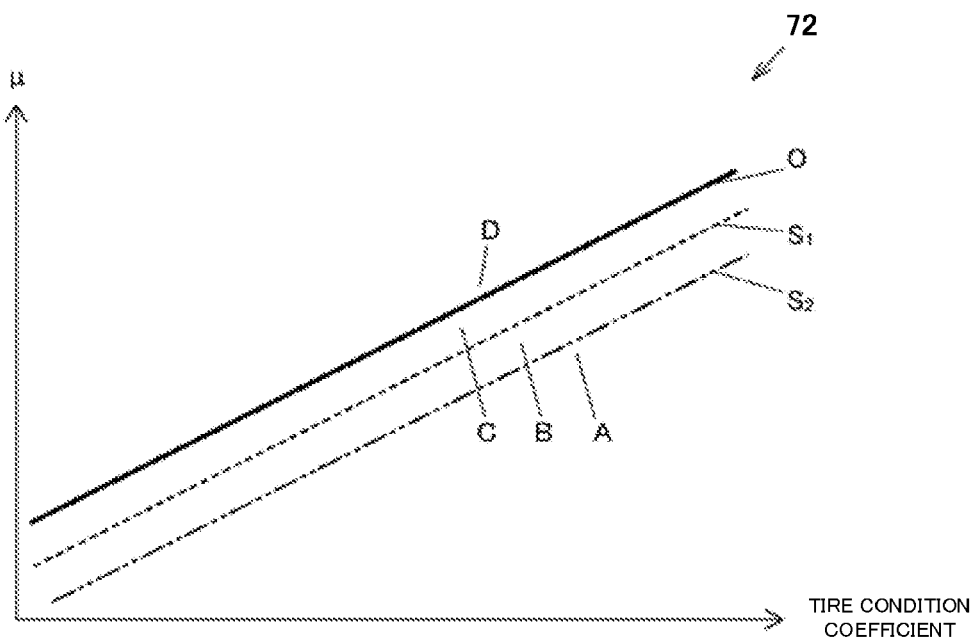
FIG. 4B is a graph illustrating a statistical map that shows a relationship between a tire condition coefficient and the friction coefficient.

The statistical map acquisition part 36 of the control unit 3 acquires a statistical map 72 generated by the statistical map generation part 53 of the information collection server 6 to be described later. FIG. 4B is a graph illustrating the statistical map 72. A standard value O in which the tire condition coefficient and a friction coefficient $\mu$ are associated with each other, and a first threshold value $S_1$ and a second threshold value $S_2$ are set in the statistical map 72. Note that the statistical map 72 is not limited to this as long as it allows evaluation of the slipperiness of the tire of the vehicle, and the statistical map 72 may be, for example, a map in which a slip ratio and the tire condition coefficient are related, or may be data in which the vehicle speed and the tire condition coefficient are related.

The standard value O is a predetermined value on the basis of the performance evaluation of the vehicle at the time of shipment from a factory, for example. The first threshold value $S_1$ and the second threshold value $S_2$ are, for example, values determined by mapping the tire condition coefficient and the friction coefficient $\mu$ of the collected data 60 and using a statistical method for the mapped data. The first threshold value $S_1$ and the second threshold value $S_2$ deviate from the standard value O by respective predetermined values. The first threshold value $S_1$ and the second threshold value $S_2$ are smaller in a value of the friction coefficient $\mu$ with respect to the tire condition coefficient than the standard value O, and the second threshold value $S_2$ is more deviated from the standard value O than the first threshold value $S_1$ is.

Here, in the statistical map 72, an area in which the friction coefficient $\mu$ is smaller than the second threshold value $S_2$ is defined as a first area A, an area surrounded by the first threshold value $S_1$ and the second threshold value $S_2$ is defined as a second area B, an area surrounded by the first threshold value $S_1$ and the standard value O is defined as a third area C, and an area in which the friction coefficient $\mu$ is larger than the standard value O is defined as a fourth area D. For example, when the value of the friction coefficient corresponding to the tire condition coefficient exists in the first area A, it means that the vehicle is in a slippery state because the friction coefficient is smaller than the standard value O, and when the value of the friction coefficient exists in the fourth area D, it means that the vehicle is in a non-slippery state because the friction coefficient is larger than the standard value O.

The tire state evaluation part 37 determines the rank information, which is an evaluation index indicating the slipperiness of the tire of the host vehicle 1, by referring to the acquired statistical map 72. More specifically, the tire state evaluation part 37 maps the estimated friction coefficient estimated by the friction coefficient estimation part 33 and the tire condition coefficient calculated by the tire condition coefficient calculation part 34 to the statistical map 72, and determines the rank information based on the area in the statistical map 72 in which the mapped data exists.

The tire state evaluation part 37 sets the rank information to a rank A (slip level: large) when the mapped data exists in the first area A, sets the rank information to a rank B (slip level: medium) when the target data exists in the second area B, and sets the rank information to a rank C (slip level: small) when the target data exists in the third area C, for example. In this way, the tire state evaluation part 37 determines the slipperiness of the host vehicle 1 based on the statistical map 72 generated from the collected data 60 related to the plurality of other vehicles 5, thus providing objective evaluation of the slipperiness of the tire of the host vehicle 1.

The functions of the tire condition coefficient calculation part 34 and the tire state evaluation part 37 may be executed by the information collection server 6 of the external device 9. The tire condition coefficient calculation part 34 and the tire state evaluation part 37 correspond to a "tire state determination part" in the present disclosure.

The notification part 38 notifies a driver of the rank information as a determination result obtained by the tire state evaluation part 37. The notification part 38 notifies the driver by displaying, on the display unit 22, maintenance information indicating, for example, tire replacement, deterioration of the vehicle or the like as caution information indicating that the tire is slippery, thus helping the driver to drive safely.

As shown in FIG. 3, the information collection server 6 includes a communication unit 61 that transmits and receives information to and from the host vehicle 1 and the plurality of other vehicles 5, a control unit 62 that executes calculation processing based on information collected via the communication unit 61, and a storage unit 63 in which a program 71 executed by the control unit 62 is stored.

The control unit 62 of the information collection server 6 includes a reception part 51 that receives the collected data 60 via the communication unit 61, a collected data extraction part 52 that extracts data from the collected data 60 under a predetermined extraction condition, a statistical map generation part 53 that generates the statistical map 72 based on the extracted data extracted by the collected data extraction part 52, a storage part 54 that stores the generated statistical map 72 in the storage unit 63, and a transmission part 55 that transmits the statistical map 72 to the vehicle.

The collected data extraction part 52 extracts data having the same vehicle type and position information as the host vehicle 1 and having the same road surface condition as the host vehicle 1 from the collected data 60. Incidentally, the extraction condition is not limited to this, and for example, the collected data extraction part 52 may extract data of at least the same vehicle type as the host vehicle 1, or may extract data of at least the same position information as the host vehicle 1.

The statistical map generation part 53 generates the statistical map 72 based on the tire condition coefficients of a plurality of extracted data extracted by the collected data extraction part 52 and the tire condition coefficients.

The transmission part 55 reads out the statistical map 72 from the storage unit 63, and transmits the transmission data generated on the basis of the read statistical map 72 to the host vehicle 1 by the communication unit 61.

Figure 6:
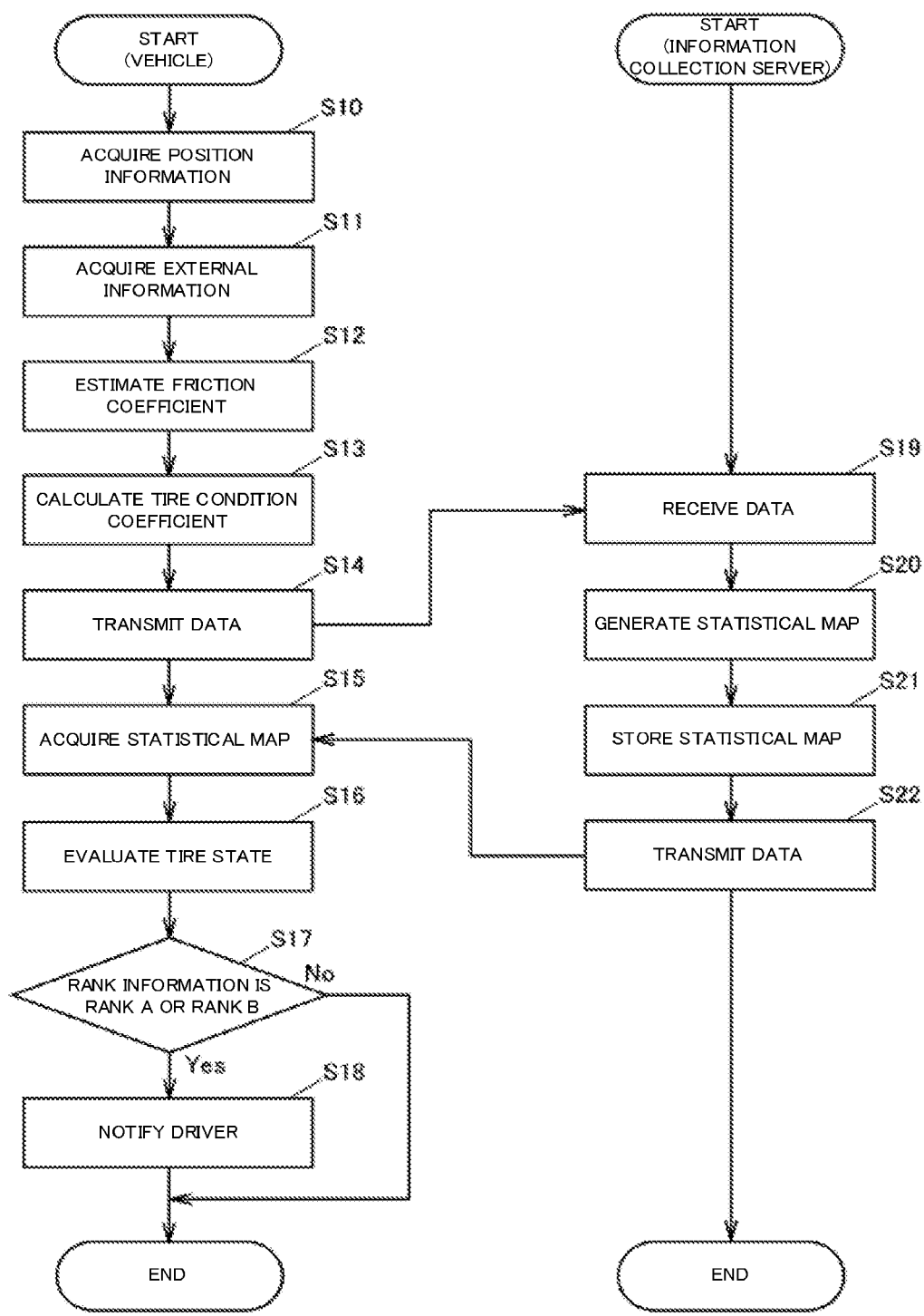
FIG. 6 is a flow chart of operations performed by a control unit of the host vehicle and the information collection server shown in FIG. 1.

Next, processing performed by the system SYS1 for determining a tire state according to the present embodiment will be described with reference to FIG. 6. FIG. 6 is a flow chart of processing performed by the control unit 3 of the host vehicle 1 and the control unit 62 of the information collection server 6.

First, the control unit 3 of the host vehicle 1 acquires the position information indicating the current position of the host vehicle 1 generated by the position detection unit 24 (step S10), estimates the road surface condition (dry, wet, snow) based on the weather information acquired from the weather information server 81 of the external device 9, and estimates the road state based on the road information (paved or unpaved) acquired from the road information server 82 (step S11).

Next, the control unit 3 of the host vehicle 1 estimates a road surface friction coefficient between the tire and the road surface based on the traveling information indicating the traveling state of the host vehicle 1 acquired from the traveling information detection unit 23 (step S12), and calculates the tire condition coefficient based on the estimated friction coefficient and the reference friction coefficient of the reference map 42 stored in the storage unit 4 (step S13). The control unit 3 transmits the estimated friction coefficient, the tire condition coefficient calculated above and the vehicle information (the vehicle ID, the vehicle type, the vehicle speed, or the like) on the host vehicle 1 to the information collection server 6 of the external device 9 (step S14).

The control unit 62 of the information collection server 6 receives the collected data 60 transmitted from the host vehicle 1 and the plurality of other vehicles 5 (step S19), and generates the statistical map 72 based on the collected data 60 (step S20). The control unit 62 stores the generated statistical map 72 in the storage unit 63 (step S21), and transmits the statistical map 72 to a vehicle side (step S22). Accordingly, the information collection server 6 ends the processing.

The control unit 3 acquires the statistical map 72 transmitted from the information collection server 6 (step S15), and obtains the rank information that is the evaluation index of the slipperiness of the tire state of the host vehicle 1 with reference to the acquired statistical map 72 (step S16). When the rank information is the rank A or the rank B described above (step S17), the control unit 3 notifies the driver of the caution information indicating that the tire is slippery (step S18). Note that the determination condition in step S17 is not limited to this, and for example, the control unit 3 may notify the caution information when the rank information is A. Or, caution information for the rank A and caution information for the rank B may have different contents. On the other hand, if the rank information is not rank A or rank B, the control unit 3 directly ends the processing as it is.

(Operation and Effects of Embodiment)

According to the embodiment described above, the system SYS1 determines the slipperiness of the tire based on the tire condition coefficient, which is indicating the slipperiness of the tire of the host vehicle 1, obtained by comparing the friction coefficient estimated by the friction coefficient estimation part with the reference friction coefficient indicating the slipperiness of the tire according to the road surface condition, thus grasping the slipperiness of the tire in consideration of an external factor. This allows the system SYS1 to accurately grasp the slipperiness of the tire.

According to the present embodiment, the system SYS1 notifies the driver of the rank information for ranking the slipperiness of the tire based on the statistical map 72 generated by the tire condition coefficients and the friction coefficients of the plurality of other vehicles 5 that are of the same vehicle type as the host vehicle 1 is and have traveled at the same position as the host vehicle 1 travels, thus providing objective information indicating the slipperiness of the tire to the driver. This helps the driver to drive safely and prevents an accident in advance.

Second Embodiment

A second embodiment of the present disclosure will be described with reference to FIGS. 7 to 12.

Figure 7:
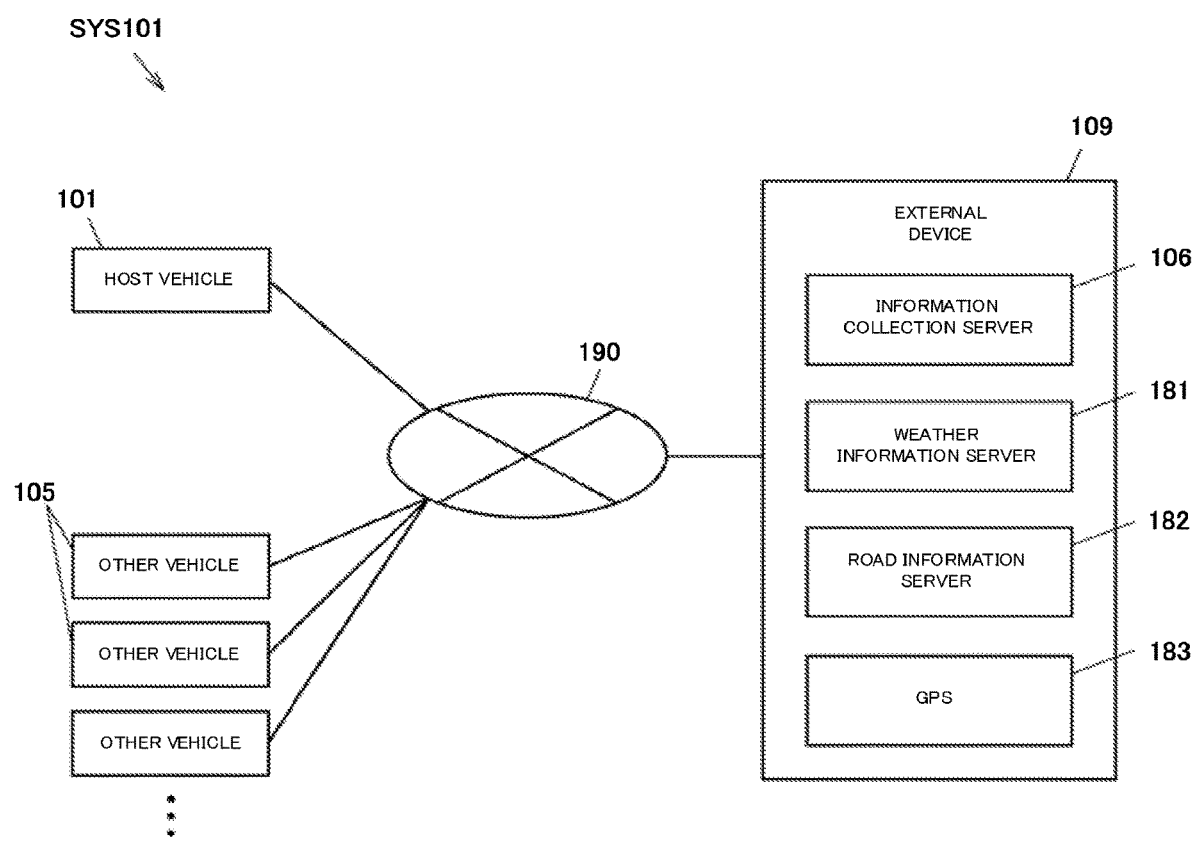
FIG. 7 is a block diagram illustrating an overall configuration of a system for predicting a road surface friction coefficient according to another embodiment of the present disclosure.

FIG. 7 is a block diagram illustrating an overall schematic configuration of a system for predicting a road surface friction coefficient according to the second embodiment of the present disclosure.

As shown in FIG. 7, a system SYS101 for predicting a road surface friction coefficient includes a host vehicle 101 serving as a determination target of the tire state, a plurality of other vehicles 105, and an external device 109 communicably connected to the host vehicle 101 and the plurality of other vehicles 105 via a wireless communication network 190.

In the present embodiment, although the host vehicle 101 is distinguished from the plurality of other vehicles 105 for convenience of description, the plurality of other vehicles 105 may be the determination targets of the tire state, and the host vehicle 101 and the plurality of other vehicles 105 each correspond to the "target vehicle" in the present disclosure.

The external device 109 includes an information collection server 106 for collecting vehicle information of the host vehicle 101 and the plurality of other vehicles 105, a weather information server 181, a road information server 182, and a GPS 183.

The weather information server 181 is a server that provides weather information throughout Japan acquired from weather stations in various places or the like. The road information server 182 is a server that provides information indicating the road state such as the unpaved road and the paved road around the current position on which the vehicle travels. The weather information provided by the weather information server 181 and the road information provided by the road information server 182 are examples of disturbance factors that affect the condition of the road surface on which the vehicle travels.

Figure 8:
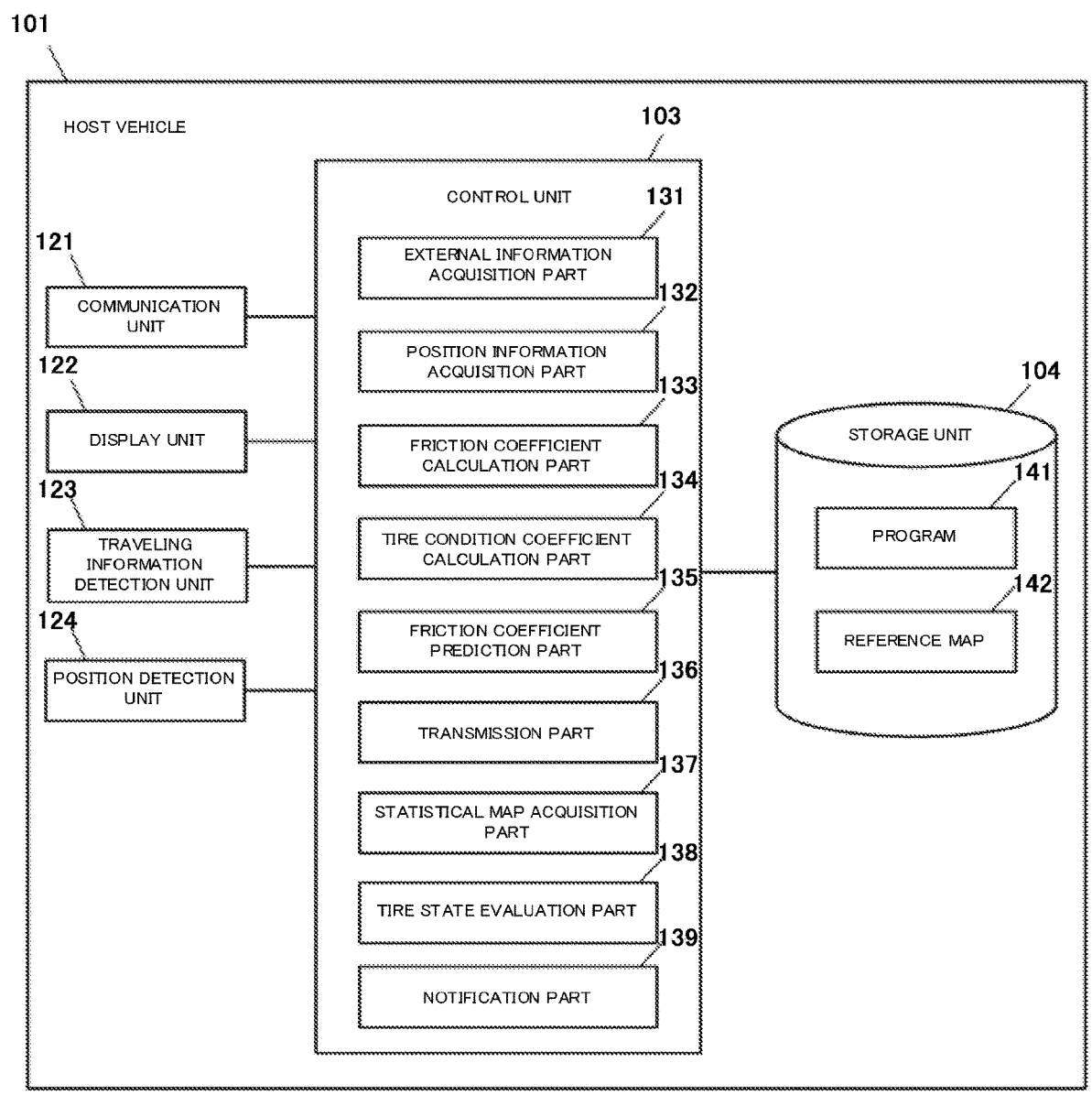
FIG. 8 is a block diagram illustrating a configuration of a host vehicle shown in FIG. 7.
Figure 9:
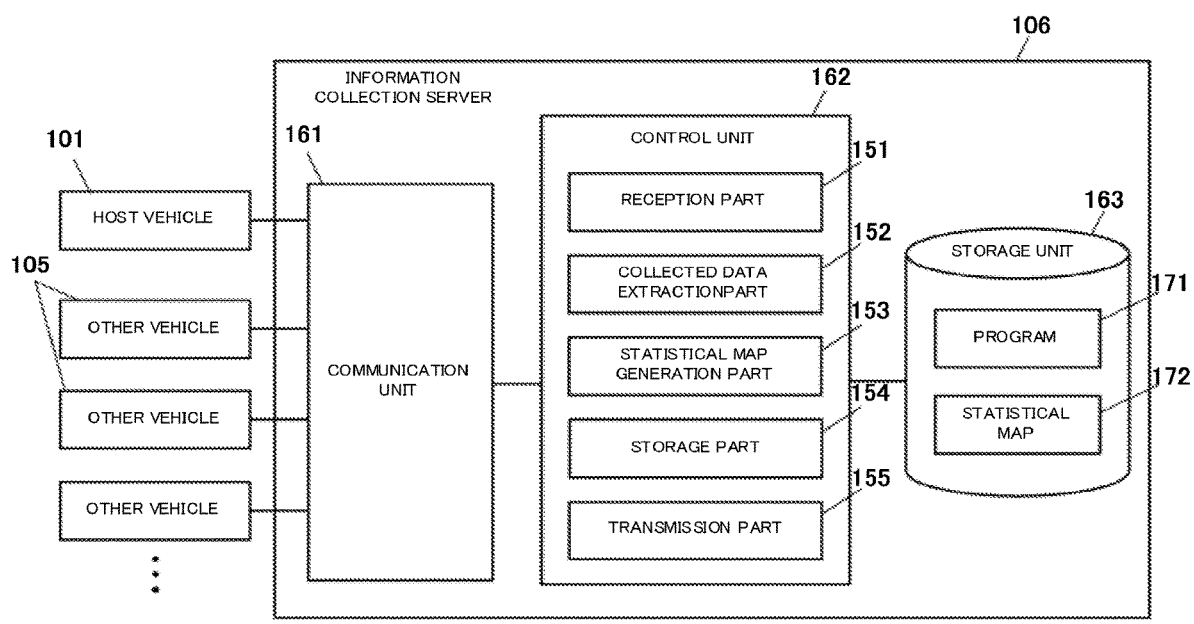
FIG. 9 is a block diagram illustrating a configuration of an information collection server shown in FIG. 7.

FIG. 8 is a block diagram illustrating a configuration of the host vehicle 101. FIG. 9 is a block diagram illustrating a configuration of the information collection server 106 of the external device 109. As shown in FIG. 8, the host vehicle 101 includes a communication unit 121 that transmits and receives information to and from the plurality of other vehicles 105 and the external device 109, a control unit 103 that controls the host vehicle 101, a display unit 122 that displays information output from the control unit 103, a traveling information detection unit 123 that detects information on a traveling state of the host vehicle 101, a position detection unit 124 that detects the current position of the host vehicle 101 based on a satellite signal from the GPS 183, and a storage unit 104 including a storage element such as a ROM or RAM. The plurality of other vehicles 105 also have the same configuration as that of the host vehicle 101.

The communication unit 121 is an electronic control device that transmits and receives information by communicating with a communication target other than the host vehicle 101 via the wireless communication network 190. The communication unit 121 includes a communication module such as the DCM.

The display unit 122 displays information output from the control unit 103. The display unit 122 is, for example, a display such as the liquid crystal display or the organic EL display, and may function as a display unit of the car navigation system or may be provided in the console panel of the vehicle.

The traveling information detection unit 123 includes a plurality of sensors that acquire parameters related to the traveling state of the host vehicle 101 such as the vehicle speed sensor for acquiring the vehicle speed, and the steering angle sensor.

The position detection unit 124 acquires position information indicating the current position of the host vehicle 101, and is a GPS receiver that acquires the current position information (longitude, latitude, or the like) of the host vehicle 101 using the satellite positioning system.

The control unit 103 includes the CPU and a peripheral circuit thereof. The control unit 103 executes a program 141 stored in the storage unit 104 to perform a function of each part such as a friction coefficient calculation part 133 to be described later.

The control unit 103 includes an external information acquisition part 131, a position information acquisition part 132, the friction coefficient calculation part 133, a tire condition coefficient calculation part 134, a friction coefficient prediction part 135, a transmission part 136, a statistical map acquisition part 137, a tire state evaluation part 138, and a notification part 139.

The external information acquisition part 131 estimates a road surface condition based on the weather information provided by the weather information server 181 of the external device 109. For example, the external information acquisition part 131 estimates that the road surface condition is dry when the weather information is fine, and the external information acquisition part 131 estimates that the road surface condition is wet when the weather information is rain. In addition, the external information acquisition part 131 acquires information indicating the road state (the paved road or the unpaved road) based on the road information provided by the road information server 182.

The position information acquisition part 132 acquires the position information generated by the position detection unit 124.

The friction coefficient calculation part 133 calculates the road surface friction coefficient at a traveling position based on the traveling information related to the traveling state of the vehicle detected by the traveling information detection unit 123. The friction coefficient can be calculated on the basis of a difference between the average rotation speed of the left and right front wheels and the average rotation speed of the left and right rear wheels in the steady traveling state, for example.

The tire condition coefficient calculation part 134 calculates the tire condition coefficient by comparing the friction coefficient calculated by the friction coefficient calculation part 133 with the reference friction coefficient indicating the slipperiness of the tire according to the road surface condition.

The tire condition coefficient calculation part 134 can obtain the reference friction coefficient from a reference map 142 (shown in FIG. 10A) stored in the storage unit 104 in advance, for example. The reference friction coefficient is a friction coefficient set for each road surface condition (dry, wet, snow), and is, for example, a value determined by the performance evaluation at the time of shipment from a factory. The tire condition coefficient calculation part 134 acquires the reference friction coefficient by collating the information on the road surface condition estimated by the external information acquisition part 131 with the reference map 142. In the reference map 142, the reference friction coefficient may be set for each road state in addition to the road surface condition. This prevents deviation of the reference friction coefficient due to difference in the road state.

Here, the tire condition coefficient is the index value that affects the slipperiness of the vehicle due to the tire state (the tire wear, the air pressure, or the like), and is tire information indicating the tire condition of the vehicle. The tire condition coefficient can be obtained, for example, as the ratio of the calculated friction coefficient to the reference friction coefficient (the tire condition coefficient=the calculated friction coefficient/the reference friction coefficient). That is, the larger the value of the tire condition coefficient is, the more difficult to slip the tire state of the traveling vehicle is. The tire condition coefficient calculation part 134 is an example of a "tire information acquisition part" in the present disclosure.

The friction coefficient prediction part 135 predicts the road surface friction coefficient ahead of the vehicle in a traveling direction based on the tire condition coefficient calculated by the tire condition coefficient calculation part 134 and the road surface condition or the road state acquired by the external information acquisition part 131.

More specifically, the friction coefficient prediction part 135 acquires the reference friction coefficient according to the road surface condition ahead of the vehicle in the traveling direction, and calculates a predicted friction coefficient ahead of the traveling direction by multiplying the reference friction coefficient by the tire condition coefficient. The reference friction coefficient according to the road surface condition ahead of the vehicle in traveling direction described above can be obtained by acquiring information on the road surface condition (dry, wet, snow) at a position ahead of the vehicle in traveling direction by the external information acquisition part 131 and the position information acquisition part 132, and collating the acquired information on the road surface condition with the reference map 142.

In the calculation of the predicted friction coefficient of the friction coefficient prediction part 135, the road surface friction coefficient of a plurality of preceding vehicles that are of the same vehicle type as the host vehicle 101 is and have traveled at the same position as the host vehicle 101 travels may be used as the reference friction coefficient. The road surface friction coefficient of the plurality of preceding vehicles is, for example, a statistical values (for example, an average value) obtained by a statistical method.

The transmission part 136 transmits the information indicating the slipperiness of the tire to the information collection server 106 by the communication unit 121. In the present embodiment, the transmission part 136 generates transmission data based on the predicted friction coefficient predicted by the friction coefficient prediction part 135, the tire condition coefficient calculated by the tire condition coefficient calculation part 134, the vehicle information (the vehicle ID, the vehicle type, the vehicle speed, or the like) on the host vehicle 101, the position information, the road state, and the road surface condition. Then the transmission part 136 transmits the transmission data to the information collection server 106 of the external device 109. This transmission data corresponds to a part of collected data 160 collected by the information collection server 106.

The information collection server 106 receives data similar to the transmission data transmitted by the transmission part 136 from the plurality of other vehicles 105, and collects the received data as the collected data 160. FIG. 11 is a table illustrating the collected data 160. As shown in FIG. 11, the collected data 160 includes, as items, the vehicle ID for identifying the vehicle, the information on the vehicle type of the vehicle, the position information indicating the current position at which the vehicle travels, the road state and the road surface condition at the position indicated by the position information, and the friction coefficient and the tire condition coefficient calculated for each vehicle. Note that the items of the collected data 160 are not limited, and the collected data 160 may include, for example, information such as the measurement date and time, the traveling distance as items.

Figure 10A:
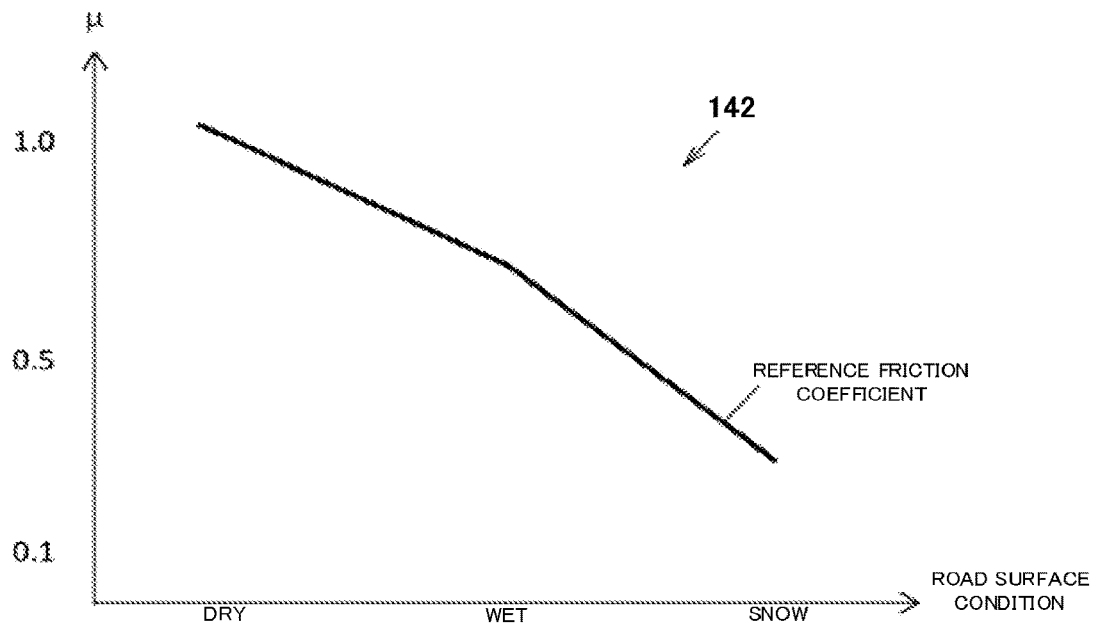
FIG. 10A is a graph illustrating a reference map that shows a relationship between a road surface condition and a friction coefficient.
Figure 10B:
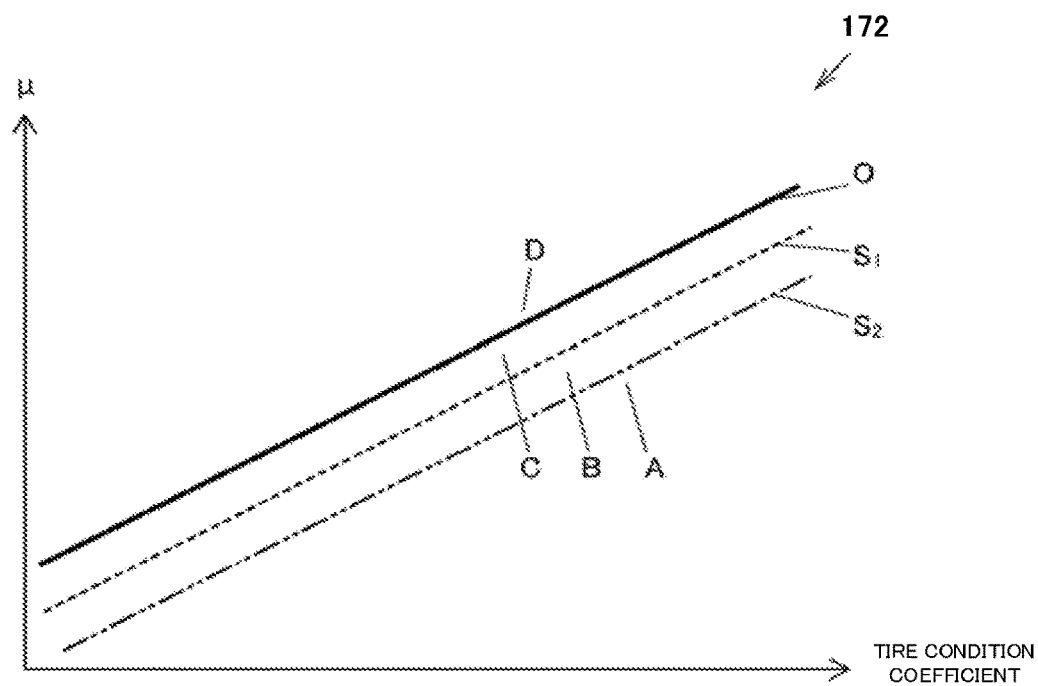
FIG. 10B is a graph illustrating a statistical map that shows a relationship between a tire condition coefficient and the friction coefficient.

The statistical map acquisition part 137 of the control unit 103 acquires the statistical map 172 generated by the statistical map generation part 153 of the information collection server 106 to be described later. FIG. 10B is a graph illustrating the statistical map 172. The standard value O in which the tire condition coefficient and the friction coefficient μ are associated with each other, and the first threshold value $S_1$ and the second threshold value $S_2$ are set in the statistical map 172. Note that the statistical map 172 is not limited to this as long as it allows evaluation of the slipperiness of the tire of the vehicle, and the statistical map 172 may be, for example, a map in which the slip ratio and the tire condition coefficient are related, or may be data in which the vehicle speed and the tire condition coefficient are related.

The standard value O is, for example, a value determined on the basis of the performance evaluation of the vehicle at the time of shipment from a factory, for example. The first threshold value $S_1$ and the second threshold value $S_2$ are, for example, values determined by mapping the tire condition coefficient and the friction coefficient μ of the collected data 160 and using a statistical method for the mapped data. The first threshold value $S_1$ and the second threshold value $S_2$ deviate from the standard value O by respective predetermined values. The first threshold value $S_1$ and the second threshold value $S_2$ are smaller in a value of the friction coefficient μ with respect to the tire condition coefficient than the standard value O, and the second threshold value $S_2$ is more deviated from the standard value O than the first threshold value $S_1$ is.

Here, in the statistical map 172, an area in which the friction coefficient μ is smaller than the second threshold value $S_2$ is defined as a first area A, an area surrounded by the first threshold value $S_1$ and the second threshold value $S_2$ is defined as a second area B, an area surrounded by the first threshold value $S_1$ and the standard value O is defined as a third area C, and an area in which the friction coefficient μ is larger than the standard value O is defined as a fourth area D. For example, when the value of the friction coefficient μ corresponding to the tire condition coefficient exists in the first area A, it means that the vehicle is in a slippery state because the friction coefficient is smaller than the standard value O, and when the value of the friction coefficient μ exists in the fourth area D, it means that the vehicle is in a non-slippery state because the friction coefficient is larger than the standard value O.

The tire state evaluation part 138 determines the rank information, that is an evaluation index indicating the slipperiness of the tire of the host vehicle 101, by referring to the acquired statistical map 172. More specifically, the tire state evaluation part 138 maps the friction coefficient calculated by the friction coefficient calculation part 133 and the tire condition coefficient calculated by the tire condition coefficient calculation part 134 to the statistical map 172, and determines the rank information based on the area on the statistical map 172 in which the mapped data exists.

The tire state evaluation part 138 sets the rank information to a rank A (slip level: large) when the mapped data exists in the first area A, sets the rank information to a rank B (slip level: medium) when the target data exists in the second area B, and sets the rank information to a rank C (slip level: small) when the target data exists in the third area C, for example. In this way, the tire state evaluation part 138 determines the slipperiness of the host vehicle 101 based on the statistical map 172 generated from the collected data 160 related to the plurality of other vehicles 105, thus providing objective evaluation of the slipperiness of the tire of the host vehicle 101.

The notification part 139 notifies the driver of the rank information as the determination result obtained by the tire state evaluation part 138. The notification part 139 may notify the driver by displaying caution information indicating that the tire is slippery on the display unit 122, for example, or may notify the driver as audio information. Notifying the driver of the rank information helps the driver to drive safely.

As shown in FIG. 9, the information collection server 106 includes a communication unit 161 that transmits and receives information to and from the host vehicle 101 and the plurality of other vehicles 105, a control unit 162 that executes calculation processing based on information collected via the communication unit 161, and a storage unit 163 in which a program 171 executed by the control unit 162 is stored.

The control unit 162 of the information collection server 106 includes a reception part 151 that receives the collected data 160 via the communication unit 161, a collected data extraction part 152 that extracts data from the collected data 160 under a predetermined extraction condition, a statistical map generation part 153 that generates the statistical map 172 based on the extracted data extracted by the collected data extraction part 152, a storage part 154 that stores the generated statistical map 172 in the storage unit 163, and a transmission part 155 that transmits the statistical map 172 to the vehicle.

The collected data extraction part 152 extracts data having the same vehicle type and position information as the host vehicle 101 and having the same road surface condition as the host vehicle 101 from the collected data 160. Incidentally, the extraction condition is not limited to this, and for example, the collected data extraction part 152 may extract data of at least the same vehicle type as the host vehicle 101, or may extract data of at least the same position information as the host vehicle 101.

The statistical map generation part 153 generates the statistical map 172 based on the tire condition coefficients of a plurality of extracted data extracted by the collected data extracting part 152 and the tire condition coefficients.

The transmission part 155 reads out the statistical map 172 from the storage unit 163, and transmits the transmission data generated on the basis of the read statistical map 172 to the host vehicle 101 by the communication unit 161.

Figure 12:
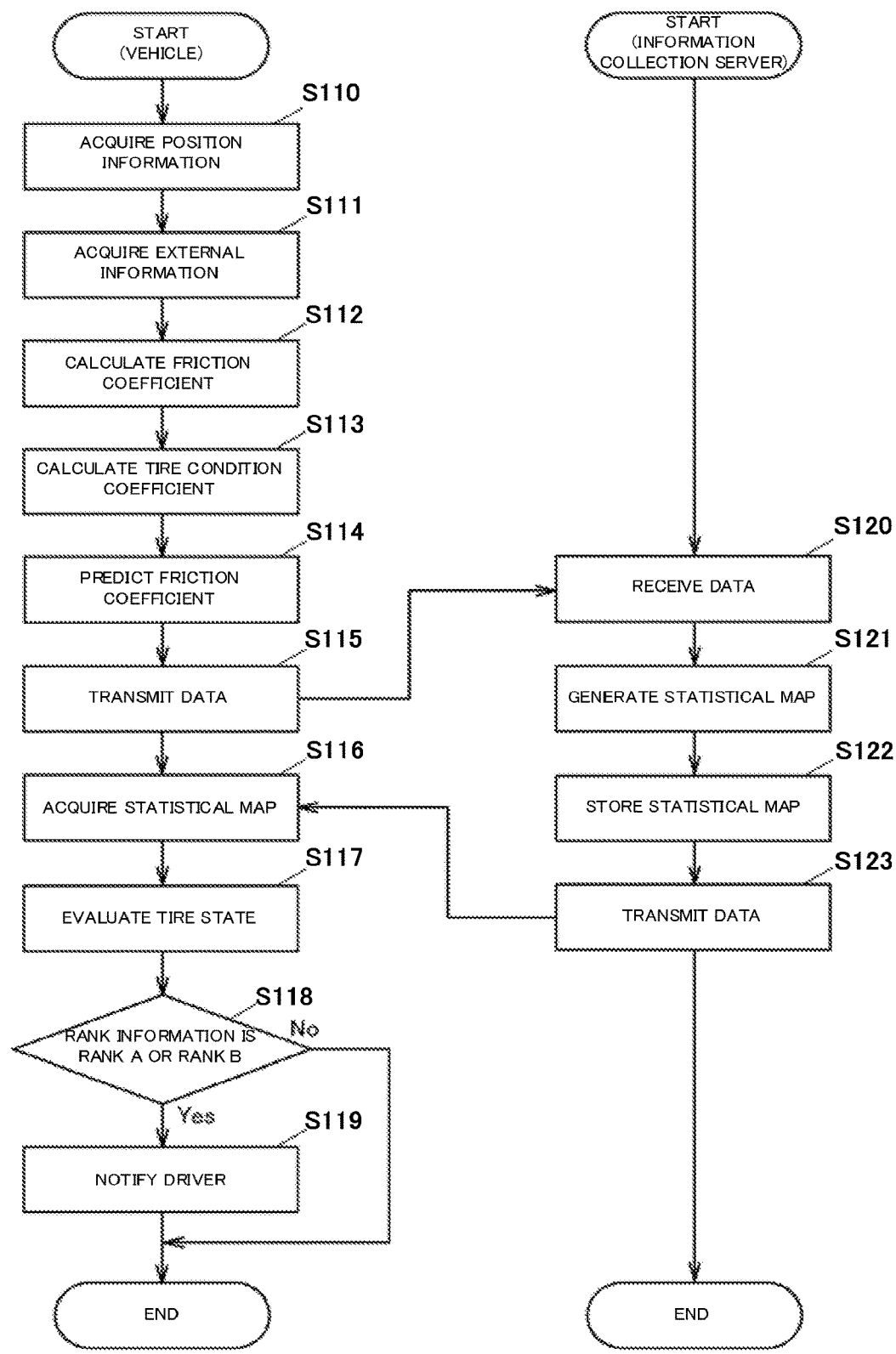
FIG. 12 is a flow chart of operations performed by a control unit of the host vehicle and the information collection server.

Next, processing performed by the system SYS101 for predicting the road surface friction coefficient according to the present embodiment will be described with reference to FIG. 12. FIG. 12 is a flow chart of processing performed by the control unit 103 of the host vehicle 101 and the control unit 162 of the information collection server 106.

First, the control unit 103 of the host vehicle 101 acquires the position information indicating the current position of the host vehicle 101 generated by the position detection unit 124 (step S110). Then, the control unit 103 estimates the road surface condition (dry, wet, snow) based on the weather information acquired from the weather information server 181 of the external device 109, and estimates the road state based on the road information (paved or unpaved) acquired from the road information server 182 (step S111).

Next, the control unit 103 of the host vehicle 101 calculates the road surface friction coefficient at the traveling position based on the traveling information indicating the traveling state of the host vehicle 101 acquired from the traveling information detection unit 123 (step S112), and calculates the tire condition coefficient based on the calculated friction coefficient and the reference friction coefficient of the reference map 142 stored in the storage unit 104 (step S113). Then, the control unit 103 acquires the road surface condition at a position ahead of the vehicle in the traveling direction, and predicts the friction coefficient of the road surface ahead of the vehicle in the traveling direction based on the reference friction coefficient according to the acquired road surface condition and the tire condition coefficient (step S114). The control unit 103 transmits the friction coefficient and the tire condition coefficient calculated above and the vehicle information (the vehicle ID, the vehicle type, the vehicle speed, or the like) on the host vehicle 101 to the information collection server 106 of the external device 109 (step S115).

The control unit 162 of the information collection server 106 receives the collected data 160 transmitted from the host vehicle 101 and the plurality of other vehicles 105 (step S120), and generates the statistical map 172 based on the collected data 160 (step S121). The control unit 162 stores the generated statistical map 172 in the storage unit 163 (step S122), and transmits the statistical map 172 to the vehicle side (step S123). Accordingly, the information collection server 106 ends the processing.

The control unit 103 acquires the statistical map 172 transmitted from the information collection server 106 (step S116), and obtains the rank information that is the evaluation index of the slipperiness of the tire state of the host vehicle 101 with reference to the acquired statistical map 172 (step S117). When the rank information is the rank A or the rank B described above (step S118), the control unit 103 notifies the driver of the caution information indicating that the tire is slippery (step S119). Note that the determination condition in step S118 is not limited to this, and for example, the control unit 103 may notify the caution information only when the rank information is A. Or caution information for the rank A and caution information for the rank B may have different contents. On the other hand, if the rank information is not rank A or rank B, the control unit 103 directly ends the processing as it is.

(Operation and Effects of Embodiment)

According to the embodiment described above, the system SYS101 predicts the friction coefficient between the tire and the road surface ahead of the vehicle in the traveling direction based on the tire condition coefficient indicating the tire state and the road surface condition, thus calculating the road surface friction coefficient accurately even when the road surface condition at the vehicle traveling position is changed.

According to the present embodiment, the system SYS101 obtains the rank information as an index value indicating the slipperiness of the tire of the host vehicle 101 based on the statistical map 172 generated from the tire condition coefficients and the friction coefficients of the plurality of other vehicles 105 that are of the same vehicle type as the host vehicle 101 is and have traveled at the same position as the host vehicle 101 travels. This allows the system SYS101 to notify the driver of objective information indicating the slipperiness of the tire of the host vehicle 101.

Although a case has been described where the friction coefficient prediction part 135 predicts the friction coefficient of the road surface at the position ahead of the host vehicle 101 in the traveling direction, the friction coefficient prediction part 135 may predict the road surface friction coefficient at a stop position during the stop of the host vehicle 101.

In this case, the friction coefficient prediction part 135 predicts the friction coefficient at the stop position of the host vehicle 101 based on the road surface condition at the current position acquired by the external information acquisition part 131 immediately before start of the host vehicle 101. For example, when an ignition of the host vehicle 101 is turned on from a stop state in which the ignition is turned off, the friction coefficient prediction part 135 may acquire, from the reference map 142, the reference friction coefficient according to the weather information at time when the ignition is turned on, and may predict the road surface friction coefficient at the stop position by multiplying the reference friction coefficient by the tire condition coefficient. This allows the system SYS101 to predict the road surface friction coefficient accurately even when the road surface condition is changed during the stop of the vehicle. When the road surface condition at time when the ignition is turned on and the road surface condition immediately before the ignition is turned off are the same as a result of comparison, the friction coefficient predicted at time when the ignition is turned off may be directly used as the predicted friction coefficient.

Third Embodiment

A third embodiment of the present disclosure will be described with reference to FIGS. 13 to 22.

Figure 13:
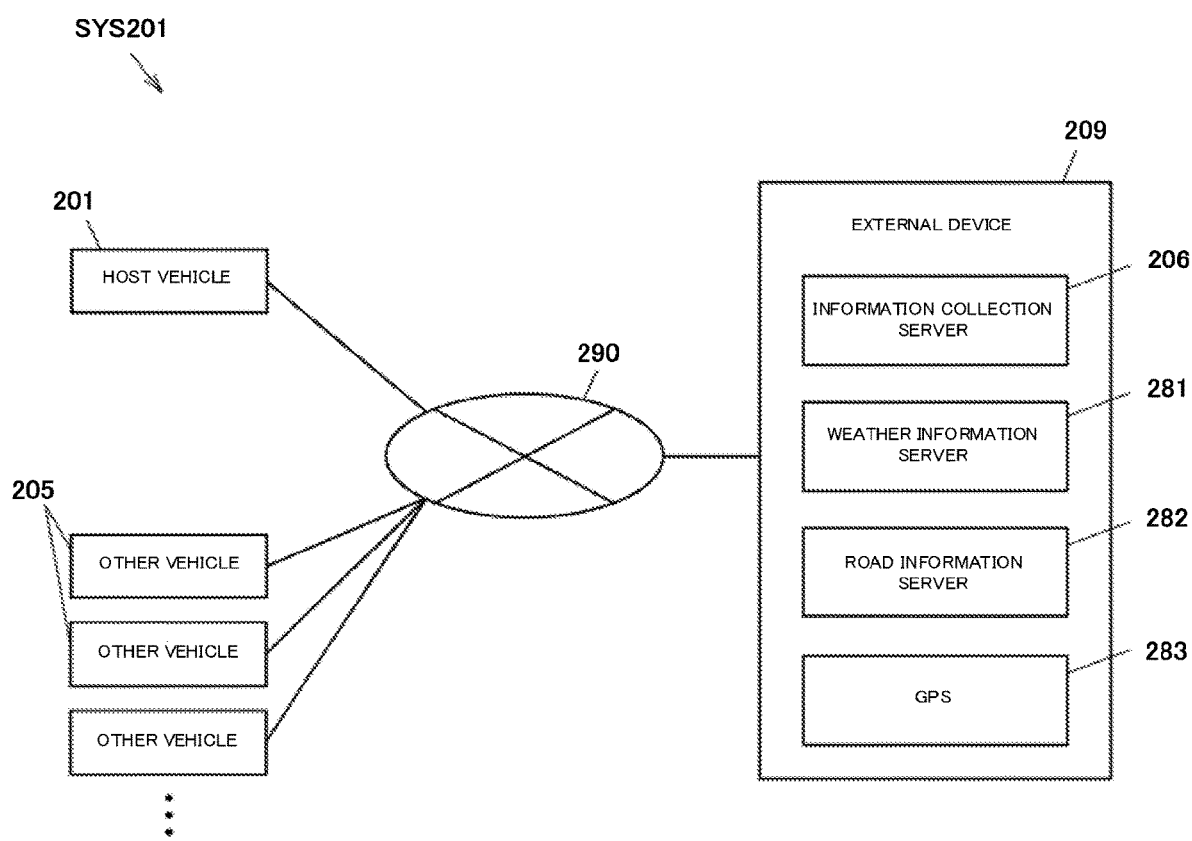
FIG. 13 is a block diagram illustrating an overall configuration of a traction performance evaluation system according to still another embodiment of the present disclosure.

FIG. 13 is a block diagram illustrating an overall schematic configuration of a system for evaluating traction performance according to the third embodiment of the present disclosure.

As shown in FIG. 13, a system SYS201 for evaluating traction performance includes a host vehicle 201 serving as a evaluation target, a plurality of other vehicles 205, and an external device 209 communicably connected to the host vehicle 201 and the plurality of other vehicles 205 via a wireless communication network 290.

In the present embodiment, although the host vehicle 201 is distinguished from the plurality of other vehicles 205 for convenience of description, the plurality of other vehicles 205 may be evaluation targets, and the host vehicle 201 and the plurality of other vehicles 205 each correspond to the "target vehicle" in the present disclosure.

The external device 209 includes an information collection server 206 for collecting vehicle information of the host vehicle 201 and the plurality of other vehicles 205, a weather information server 281, a road information server 282, and a GPS 283.

The weather information server 281 is a server that provides weather information throughout Japan acquired from weather stations in various places or the like. The road information server 282 is a server that provides information indicating the road state (for example, the paved road or the like) corresponding to the current position on which the vehicle travels. The weather information provided by the weather information server 281 and the road information provided by the road information server 282 are examples of disturbance factors that affect the condition of the road surface on which the vehicle travels.

Figure 14:
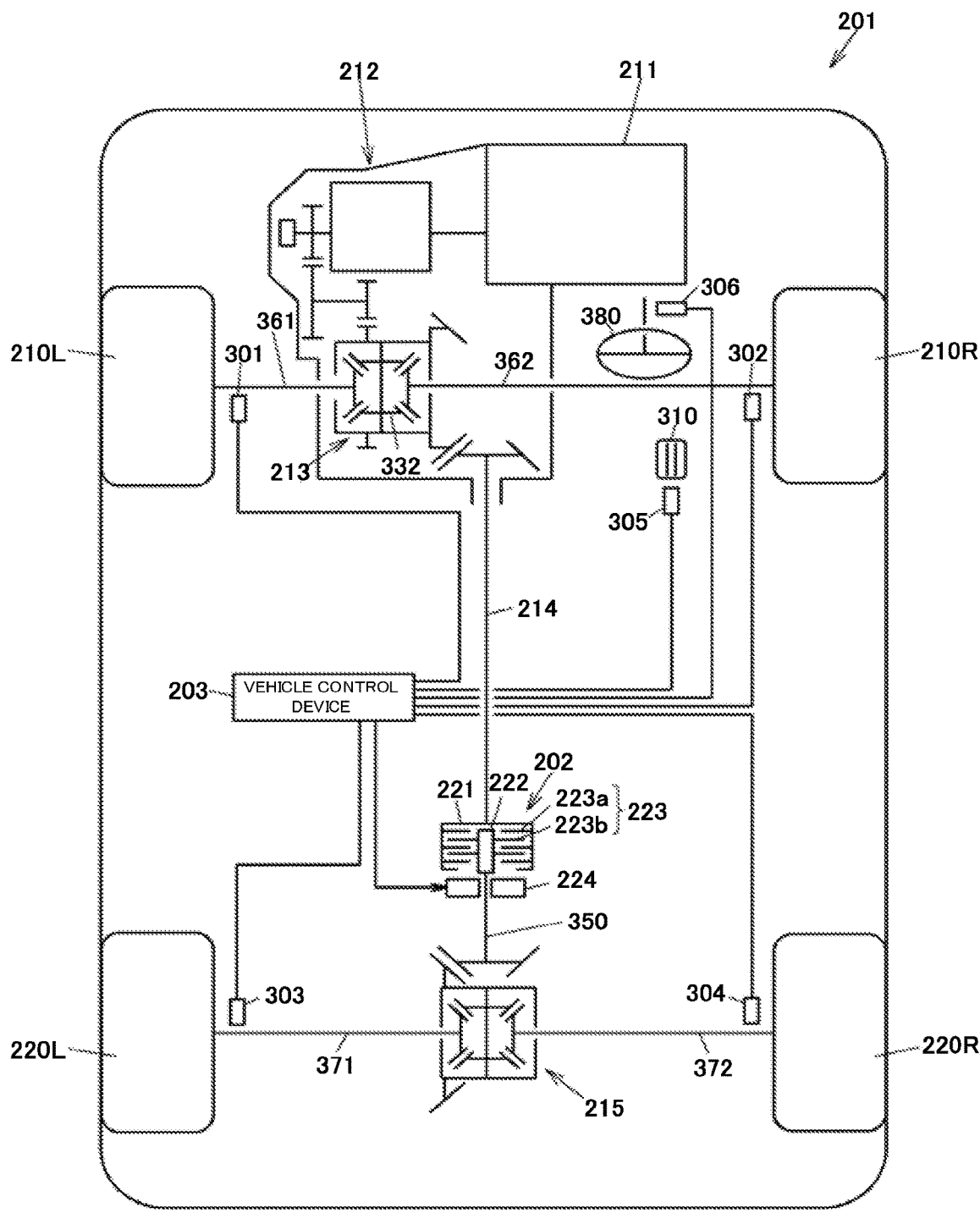
FIG. 14 is a block diagram illustrating a schematic configuration of a host vehicle shown in FIG. 13.

FIG. 14 is a block diagram illustrating a schematic configuration of the host vehicle 201 according to the present embodiment. The host vehicle 201 is a four-wheel drive vehicle that can change distribution of a driving force from a four-wheel drive state in which the driving force is transmitted to the front vehicle wheels and the rear vehicle wheels to a two-wheel drive state in which the driving force is transmitted only to the front vehicle wheels. The plurality of other vehicles 205 also have the same configuration as that of the host vehicle 201 described in FIG. 14.

As shown in FIG. 14, the host vehicle 201 includes an engine 211 as a driving source for generating a driving force (torque) for traveling, a transmission 212 for shifting an output of the engine 211, front vehicle wheels 210L, 210R as a pair of left and right main driving wheels to which the driving force of the engine 211 shifted by the transmission 212 is constantly transmitted, and rear vehicle wheels 220L, 220R as a pair of left and right auxiliary driving wheels to which the driving force of the engine 211 is transmitted according to the vehicle state.

The host vehicle 201 includes a front differential 213 that differentially distributes the output of the engine 211 to the front vehicle wheels 210L, 210R and transmits the output to a propeller shaft 214, a rear differential 215 that differentially distributes a rotational force of the propeller shaft 214 to the rear vehicle wheels 220L, 220R, drive shafts 361, 362 for left and right front vehicle wheels, drive shafts 371, 372 for left and right rear wheels, a driving force transmission device 202 disposed between the propeller shaft 214 and the rear differential 215, and a control device 203 for controlling the driving force transmission device 202.

The control device 203 acquires various detection values including a detection value of rotational speed sensors 301 to 304 for detecting rotational speeds of the left and right front vehicle wheels 210L, 210R and the left and right rear vehicle wheels 220L, 220R, a detection value of an accelerator pedal sensor 305 for detecting a press-down amount of an accelerator pedal 310, and a detection value of a steering angle sensor 306 for detecting a steering angle of a steering wheel 380, directly from each sensor, or from another control device, not shown, of the host vehicle 201 via an in-vehicle network such as a controller area network (CAN), and supplies a current to the driving force transmission device 202 based on these detection values or the like. The information indicated by the detection values obtained from the rotational speed sensors 301 to 304, the accelerator pedal sensor 305, and the steering angle sensor 306 is an example of "the traveling information" in the present disclosure. Details of the control device 203 will be described later.

The driving force transmission device 202 increases or decreases the driving force transmitted to the left and right rear vehicle wheels 220L, 220R according to the current supplied from the control device 203. In addition, the driving force transmission device 202 includes a housing 221, a cylindrical output shaft 222 supported rotatably coaxially with the housing 221, a multi-plate clutch 223 housed in the housing 221, and an actuator 224 for pressing the multi-plate clutch 223. The multi-plate clutch 223 includes a plurality of outer clutch plates 223a rotating integrally with the housing 221 and a plurality of inner clutch plates 223b rotating integrally with the output shaft 222, and the outer clutch plates 223a and the inner clutch plates 223b are in frictional contact under receiving a pressing force of the actuator 224.

Figure 15:
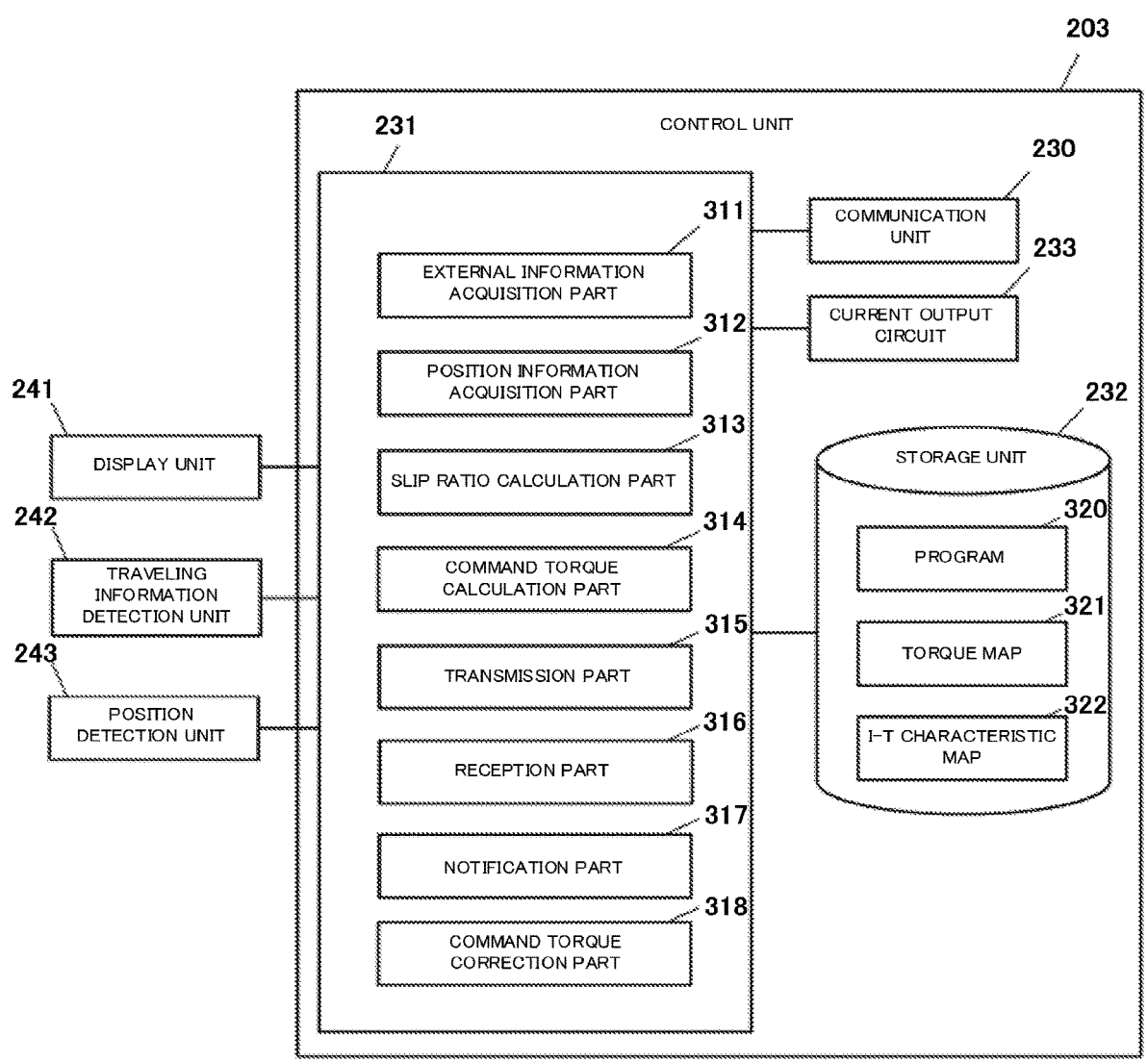
FIG. 15 is a block diagram illustrating a configuration of a control device shown in FIG. 14.

FIG. 15 is a block diagram illustrating a configuration of the control device 203. FIG. 16 is a block diagram illustrating a configuration of the information collection server 206 of the external device 209.

As shown in FIG. 15, the control device 203 includes a communication unit 230 that transmits and receives information to and from the plurality of other vehicles 205 and the external device 209 via the wireless communication network 290, a control unit 231 including the CPU and a peripheral circuit thereof, a storage unit 232 including a storage element such as a ROM and a RAM, and a current output circuit 233 for outputting a current to the actuator 224 of the driving force transmission device 202.

The control device 203 is connected to a display unit 241 that displays information output by the control unit 231, a traveling information detection unit 242 that detects traveling information indicating a traveling state of the host vehicle 201, and a position detection unit 243 that detects the current position of the host vehicle 201.

The display unit 241 displays information output from the control unit 231. The display unit 241 is, for example, a display such as the liquid crystal display or the organic EL display, and may function as a display unit of the car navigation system or may be provided in the console panel of the vehicle.

The traveling information detection unit 242 includes a plurality of sensors that acquire parameters related to the traveling state of the host vehicle 201, such as the rotational speed sensors 301 to 304, the accelerator pedal sensor 305, and the steering angle sensor 306.

The position detection unit 243 acquires position information indicating the current position of the host vehicle 201, and is a GPS receiver that acquires the current position information (longitude, latitude, or the like) of the host vehicle 201 using the satellite positioning system.

The communication unit 230 is an electronic control device that transmits and receives information by communicating with a communication target other than the host vehicle 201 via the wireless communication network 290. The communication unit 230 includes a communication module such as the DCM.

The control unit 231 controls the driving force transmission device 202 by executing a program 320 stored in the storage unit 232. The storage unit 232 stores a torque map 321 in addition to the program 320. The torque map 321 defines map information for calculating the driving force to be distributed to the left and right rear vehicle wheels 220L, 220R based on a front and rear wheel rotational speed difference, which is a difference between an average rotational speed of the left and right front vehicle wheels 210L, 210R and an average rotation speed of the left and right rear vehicle wheels 220L, 220R, the press-down amount of accelerator pedal 310, the steering angle, and vehicle speed, for example.

The control unit 231 refers to the torque map 321 based on the vehicle traveling state, and calculates a command current corresponding to the driving force to be distributed to the left and right rear vehicle wheels 220L, 220R. Further, the control unit 231 generates a PWM signal such that a current corresponding to the command current is output from the current output circuit 233 to the driving force transmission device 202.

The control unit 231 of the control device 203 includes an external information acquisition part 311, a position information acquisition part 312, a slip ratio calculation part 313, a command torque calculation part 314, a transmission part 315, a reception part 316, a notification part 317, and a command torque correction part 318.

The external information acquisition part 311 estimates a road surface condition based on the weather information provided by the weather information server 281 of the external device 209. For example, the external information acquisition part 311 estimates that the road surface condition is dry when the weather information is fine, and the external information acquisition part 311 estimates that the road surface condition is wet when the weather information is rain. In addition, the external information acquisition part 311 acquires information indicating the road state (the paved road or the unpaved road) based on road information provided by the road information server 282.

The position information acquisition part 312 acquires the position information generated by the position detection unit 243.

The slip ratio calculation part 313 calculates the slip ratio based on the traveling information on the traveling state of the vehicle detected by the traveling information detection unit 242. The slip ratio can be calculated on the basis of, for example, each vehicle wheel speed detected through the rotational speed sensors 301 to 304 and an estimated vehicle body speed calculated on the basis of these vehicle wheel speeds. In addition, the slip ratio may be calculated on the basis of a difference in the number of rotations between the front vehicle wheel and the rear vehicle wheel.

The command torque calculation part 314 calculates the command torque to be transmitted by the driving force transmission device 202 based on the detection result of the traveling information detection unit 242.

The transmission part 315 transmits information on a traction performance to the information collection server 206 using the communication unit 230. The transmission part 315 generates the transmission data based on the slip ratio calculated by the slip ratio calculation part 313, a command current value calculated by the command torque calculation part 314, the vehicle information (the vehicle ID, the vehicle type, or the like) on the host vehicle 201, the position information, road information, and the weather information. Then the transmission part 315 transmits the transmission data to the information collection server 206 of the external device 209. This transmission data corresponds to a part of collected data 260 collected by the information collection server 206.

FIG. 16 is a table illustrating the collected data 260. As shown in FIG. 16, the collected data 260 includes, as items, the vehicle ID for identifying the vehicle, the vehicle type information on the vehicle type of the vehicle, the position information indicating the current position at which the vehicle travels, the road state and the road surface condition at the position indicated by the position information, and the friction coefficient, the slip ratio, and the command current value calculated for each vehicle. Note that the items of the collected data 260 are not limited, and the collected data 260 may include, for example, information such as the measurement date and time, the traveling distance as items.

The reception part 316 receives an evaluation result 273 by a traction performance evaluation part 254 and a determination result by a deterioration progress determination part 256 from the information collection server 206 to be described later.

The notification part 317 notifies the driver of the rank information as the evaluation result 273 obtained by the reception part 316. The notification part 317 notifies the driver by displaying, on the display unit 241, maintenance information indicating, for example, tire replacement, deterioration of the vehicle or the like as caution information indicating that the host vehicle 201 is slippery. This helps the driver to drive safely.

The notification part 317 notifies the driver that the rank information has suddenly decreased as the determination result determined by the deterioration progress determination part 256. This notifies the driver of an abnormality, thus promoting safe driving or providing information indicating that repair is necessary to the driver.

The command torque correction part 318 calculates a command current value of a control current to be supplied to the driving force transmission device 202 based on the command torque, and corrects the calculated command current value based on the rank information obtained by the traction performance evaluation part 254 of the information collection server 206. Details of the command torque correction part 318 will be described later.

Figure 17:
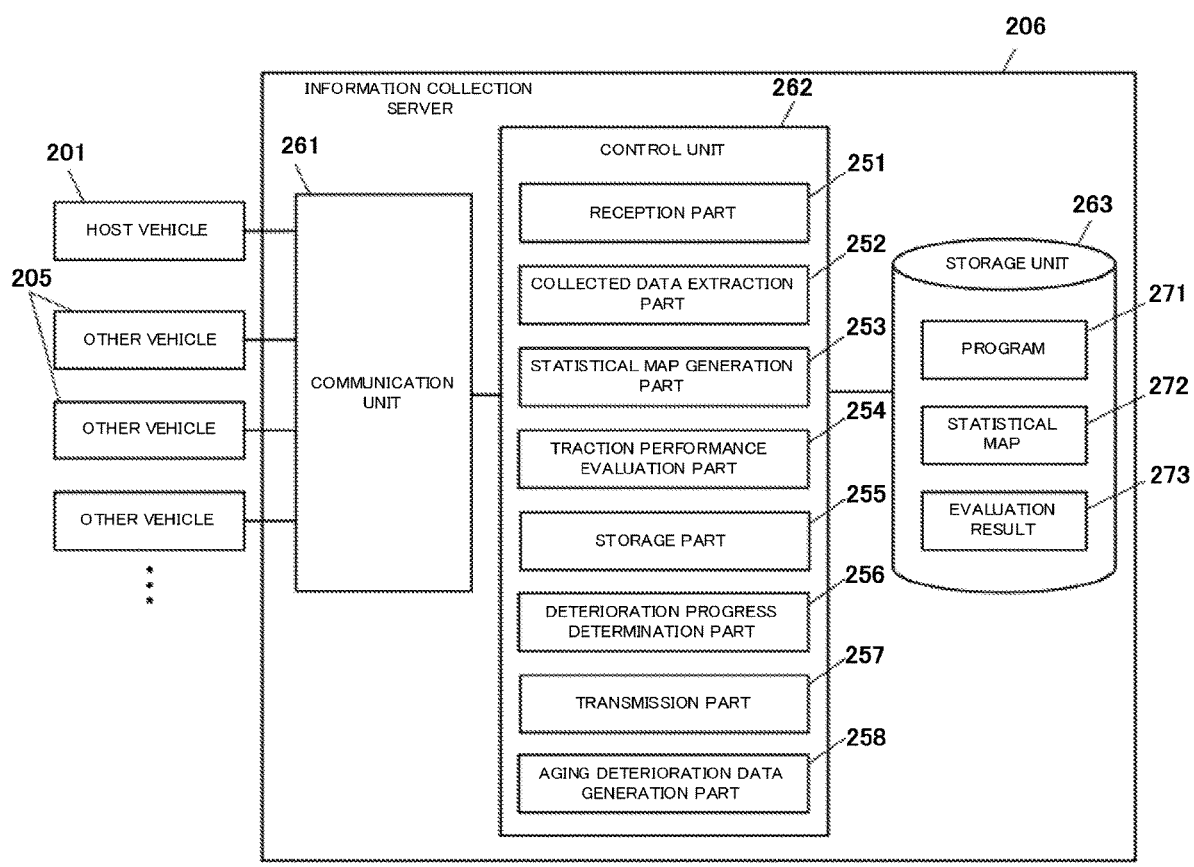
FIG. 17 is a block diagram illustrating a configuration of the information collection server shown in FIG. 13.

As shown in FIG. 17, the information collection server 206 includes a communication unit 261 that transmits and receives information to and from the host vehicle 201 and the plurality of other vehicles 205, a control unit 262 that executes calculation processing based on information collected via the communication unit 261, and a storage unit 263 in which a program 271 executed by the control unit 262 is stored. The information collection server 206 receives not only the transmission data transmitted by the transmission part 315 of the control unit 231 in the control device 203, but also data similar to the transmission data from the plurality of other vehicles 205, and collects the received data as the collected data 260.

The control unit 262 of the information collection server 206 includes a reception part 251 that receives the collected data 260 collected from the host vehicle 201 and the other vehicles 205 via the communication unit 261, a collected data extraction part 252 that extracts data from the collected data 260 under a predetermined extraction condition, a statistical map generation part 253 that generates the statistical map 272 based on the extracted data extracted by the collected data extraction part 252, the traction performance evaluation part 254 that evaluates the traction performance based on the statistical map 272, a storage part 255, the deterioration progress determination part 256 that determines the progress of deterioration in the traction performance, a transmission part 257 that transmits the evaluation result 273 by the traction performance evaluation part 254 and the determination result by the deterioration progress determination part 256 to the vehicle, and aging deterioration data generation part 258 that generates aging deterioration data based on the data accumulated in the storage unit 263.

The collected data extraction part 252 extracts data having the same vehicle type and position information as the host vehicle 201 and having the same road surface condition as the host vehicle 201 from the collected data 260. That is, the collected data extraction part 252 extracts, from the collected data 260, information on the plurality of other vehicles 205 that are of the same vehicle type as the host vehicle 201 is, that have traveled at the same position as the host vehicle 201 travels, and that are in the same environment (for example, the paved road or the like) as the host vehicle 201 is. The statistical map 272 generated on the basis of the extracted data thus extracted improves an accuracy of the evaluation result 273 by the traction performance evaluation part 254. Incidentally, the extraction condition of the collected data extraction part 252 is not limited to this, and the collected data extraction part 252 may extract data of at least the same vehicle type as the host vehicle 201, and may extract data of at least the same position information as the host vehicle 201.

Figure 18:
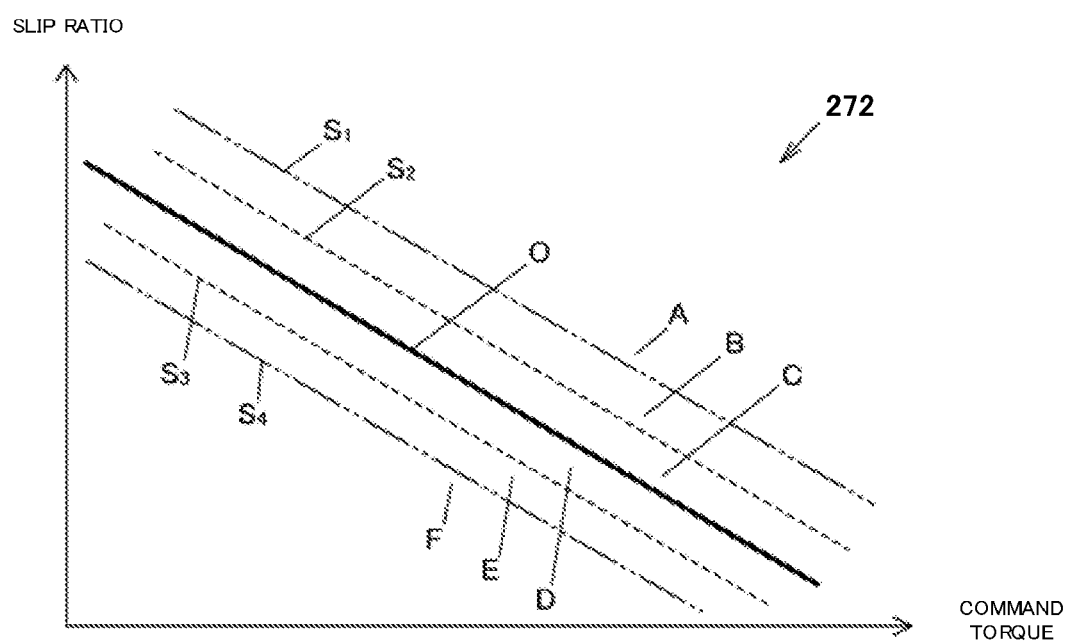
FIG. 18 is a graph illustrating a statistical map that shows a relationship between a command torque and a slip ratio.

FIG. 18 is a graph illustrating the statistical map 272. The statistical map 272 is data in which the command torque and the slip ratio are associated with each other, a horizontal axis indicates the command torque, and a vertical axis indicates the slip ratio. Incidentally, the statistical map 272 may be any data as long as it allows evaluation of the traction performance of the vehicle, and may be, for example, data in which the friction coefficient and the slip ratio are related, or may be data in which the slip ratio and the vehicle speed are related.

A predetermined standard value O, a first threshold values $S_1$ to a fourth threshold value $S_4$ are set in the statistical map 272. The standard value O is, for example, a value determined on the basis of the performance evaluation of the vehicle at the time of shipment from a factory. The first threshold value $S_1$ to the fourth threshold value $S_4$ are, for example, values determined by mapping the slip ratio and the command torque of the collected data 260 and using a statistical method for the mapped data. The first threshold value $S_1$ to the fourth threshold value $S_4$ deviate from the standard value O by respective predetermined values.

The first threshold value $S_1$ and the second threshold value Stare larger in a value of the slip ratio with respect to the command torque than the standard value O, and the first threshold value $S_1$ is more deviated from the standard value O than the second threshold value $S_2$ is. The third threshold value $S_3$ and the fourth threshold value $S_4$ are smaller in a value of the slip ratio with respect to the command torque than the standard value O, and the fourth threshold value $S_4$ is more deviated from the standard value O than the third threshold value $S_3$ is.

Here, in the statistical map 272, an area in which the slip ratio is larger than the first threshold value $S_1$ is defined as a first area A, an area surrounded by the first threshold value $S_1$ and the second threshold value $S_2$ is defined as a second area B, an area surrounded by the second threshold value $S_2$ and the standard value O is defined as a third area C, an area surrounded by the third threshold value $S_3$ and the standard value O is defined as a fourth area D, an area surrounded by the third threshold value $S_3$ and the fourth threshold value $S_4$ is defined as a fifth area E, and an area in which the slip ratio is smaller than the fourth threshold value $S_4$ is defined as a sixth area F. For example, when the value of the slip ratio corresponding to the command torque exists in the first area A, it means that the vehicle is in a slippery state, and when the value of the slip ratio corresponding to the command torque exists in the sixth area F, it means that the vehicle is in a non-slippery state.

The traction performance evaluation part 254 evaluates the traction performance of the host vehicle 201 by comparing the slip ratio calculated by the slip ratio calculation part 313 and the command torque calculated by the command torque calculation part 314 with the statistical map 272 as a reference slip ratio. Specifically, the traction performance evaluation part 254 maps the calculated data of the slip ratio and the command torque to the statistical map 272, and determines the rank information as the evaluation result 273 of the traction performance based on the area in the statistical map 272 in which the calculation data exists.

The rank information is information ranked according to the traction performance of the host vehicle 201, and the traction performance evaluation part 254 sets the rank information to a rank A (slip level: large) when the calculated data exists in the first area A of the statistical map 272, sets the rank information to a rank B (slip level: medium) when the calculated data exists in the second area B, and sets the rank information to a rank C (slip level: small) when the calculated data exists in the third area C, for example. As described above, the traction performance evaluation part 254 determines the slipperiness of the host vehicle 201 based on the statistical map 272 generated from the collected data 260 related to the plurality of other vehicles 205, thus providing objective grasp the traction performance of the host vehicle 201.

The storage part 255 stores the statistical map 272 and the rank information as the evaluation result 273 of the traction performance evaluation part 254 in the storage unit 263.

The deterioration progress determination part 256 compares the current evaluation result 273 evaluated by the traction performance evaluation part 254 with the past evaluation result 273 stored in the storage part 255, and determines the progress of the deterioration in the traction performance of the host vehicle 201 as the target vehicle based on the compared result. That is, the deterioration progress determination part 256 determines the progress of the deterioration based on fluctuation of the evaluation result 273 of the traction performance within a predetermined period. In the present embodiment, the deterioration progress determination part 256 determines that the traction performance has deteriorated when the rank information as the evaluation result 273 decreases by two ranks within the predetermined period.

Figure 19:
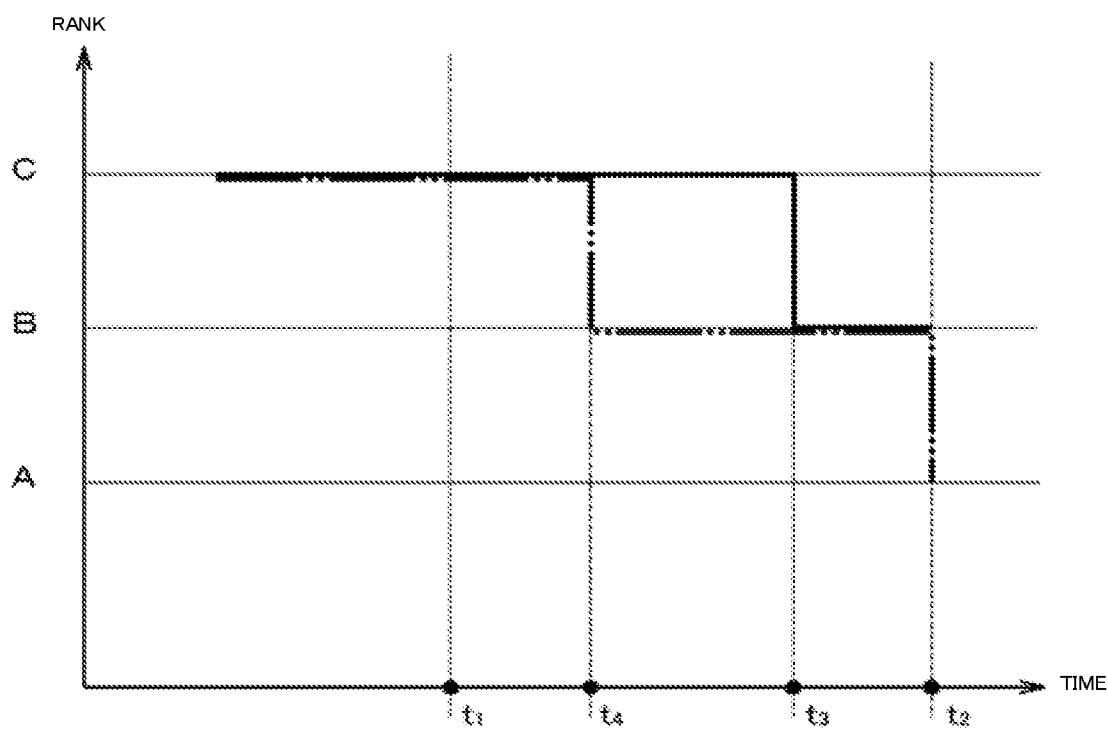
FIG. 19 is a graph illustrating transition of rank information over time.

FIG. 19 is a graph illustrating transition of the rank information over time. In FIG. 19, for convenience of explanation, the transition of the rank information of any two vehicles is shown, the transition of the rank information of a first vehicle is shown by a solid line, and the transition of the rank information of a second vehicle is shown by a chain double-dashed line.

As shown in FIG. 19, in a case of the first vehicle indicated by the solid line, the rank information decreases from the rank C to the rank B at a time point $t_3$ between a present time point $t_2$ when the host vehicle 201 is traveling and a past time point $t_1$ that is a predetermined time before the present time point, and the rank information is maintained in the rank B until a present time point $t_2$. Here, the predetermined time is set to, for example, one month to six months.

On the other hand, in the case of the second vehicle indicated by the chain double-dashed line, the rank information decreases from the rank C to the rank B at a time point $t_4$ between the present time point $t_2$ and the past time point $t_1$, and the rank information decreases from the rank B to the rank A at the present time point $t_2$.

For the second vehicle, the deterioration progress determination part 256 sets the evaluation result 273 by the traction performance evaluation part 254 at the past time point $t_1$, which is traced back from the present time point $t_2$ by the predetermined time, as the past evaluation result 273. Incidentally, the deterioration progress determination part 256 acquires the past evaluation result 273 at the past time point $t_1$ from the storage unit 263. The deterioration progress determination part 256 compares the rank information (rank C) that is the past evaluation result 273 at the past time point $t_1$ and the rank information (rank A) that is the current evaluation result 273 at the present time point $t_2$. Based on the compared result that the rank information decreases by two ranks, the deterioration progress determination part 256 transmits information indicating sudden change in the rank information to the host vehicle 201 via the transmission part 257.

On the other hand, for the first vehicle, the rank information decreases by only one rank, so that the deterioration progress determination part 256 determines that no sudden deterioration happens.

The aging deterioration data generation part 258 generates aging deterioration data based on the accumulated data stored in the storage unit 263. The accumulated data includes, for example, the slip ratio, the friction coefficient, the evaluation result, or the like calculated by the control unit 262 of the information collection server 206, and is stored in the storage unit 263.

Figure 20:
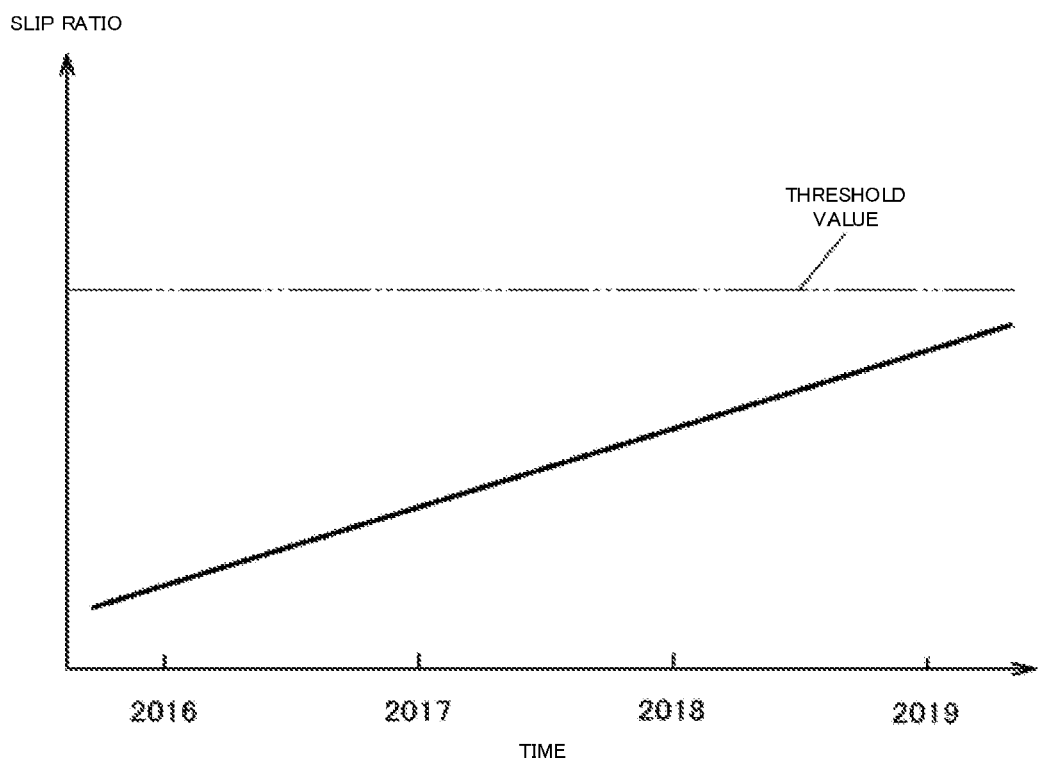
FIG. 20 is a graph illustrating a relationship between the slip ratio and elapsed time.

FIG. 20 is a graph illustrating aging deterioration data showing transition of the slip ratio over time, more particularly, showing the transition of the slip ratio in the past several years, in which a vertical axis shows the slip ratio, and a horizontal axis shows time. FIG. 20 shows that the slip ratio increases over time. In other words, it shows that the traction performance gradually deteriorates.

This aging deterioration data visualizes the performance of the vehicle, thus improving convenience. For example, the aging deterioration data allows indicating the timing of tire replacement, the timing of the repair, and a standard of an evaluation value at the time of vehicle resale. In the embodiment described above, the aging deterioration data shows the transition of the slip ratio, but is not limited thereto, and may show the transition of the rank information.

Note that a predetermined threshold value may be displayed in the graph of the aging deterioration data. This allows notifying the driver that, for example, it is time to repair and replace, when the aging slip ratio exceeds the threshold value.

Figure 21:
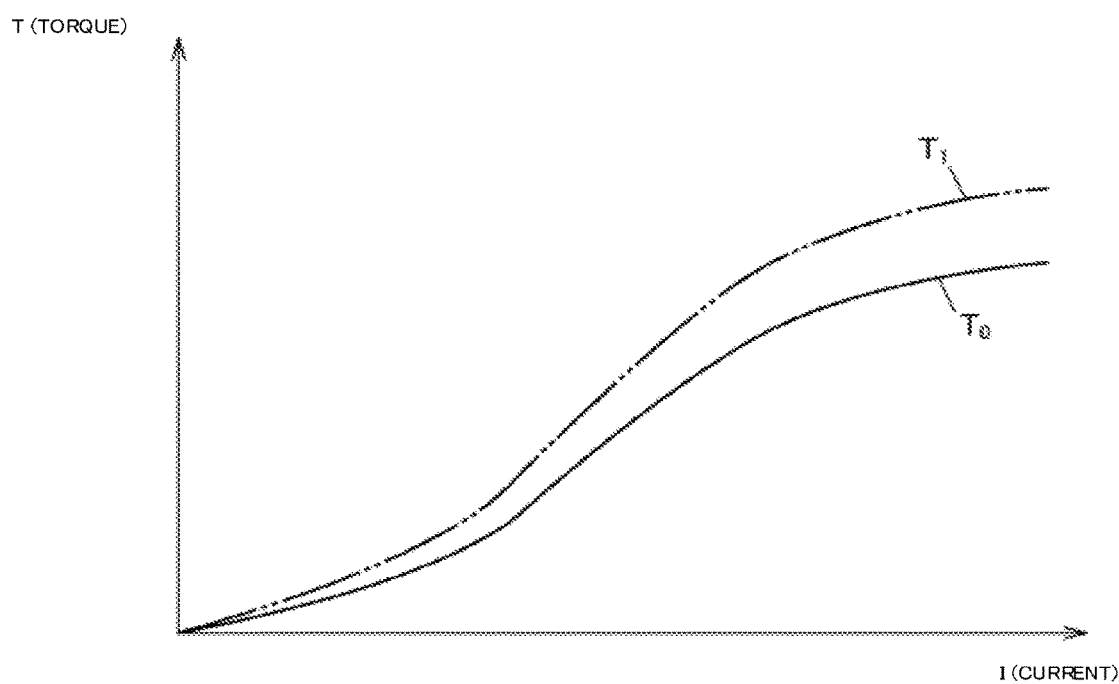
FIG. 21 is a graph illustrating an I-T characteristic map that shows a relationship between a command current value and the command torque.

Next, the command torque correction part 318 in the control unit 231 of the control device 203 described above will be described. An I-T characteristic map 322, in which a command torque T and a command current value I are related, is set in the command torque correction part 318. FIG. 21 illustrates the I-T characteristic map 322. A vertical axis of the I-T characteristic map 322 shows the command torque T, and a horizontal axis shows the command current value I. As shown in FIG. 21, a target torque $T_0$ obtained by a vehicle evaluation at the time of shipment of the vehicle is set in the I-T characteristic map 322. The target torque $T_0$ is set such that the command current value I increases as an absolute value of the command torque T increases.

The command torque correction part 319 calculates the command current value by collating the calculated command torque with the I-T characteristic map 322, and corrects the command current value by multiplying the calculated command current value by a correction coefficient according to the rank information. The correction coefficient is obtained, for example, by referring to a correction coefficient map in which the rank information and the correction coefficient are related in advance. The correction coefficient is a value for correcting a deviation from the standard value O of the calculation data in the statistical map 272. For example, when the rank information obtained from the calculation data is the ranks A, rank B, or rank C, the command torque correction part 319 multiplies the command current value by the correction coefficient to obtain an output torque Ti (a chain double-dashed line in FIG. 21) larger than the target torque $T_0$.

Figure 22:
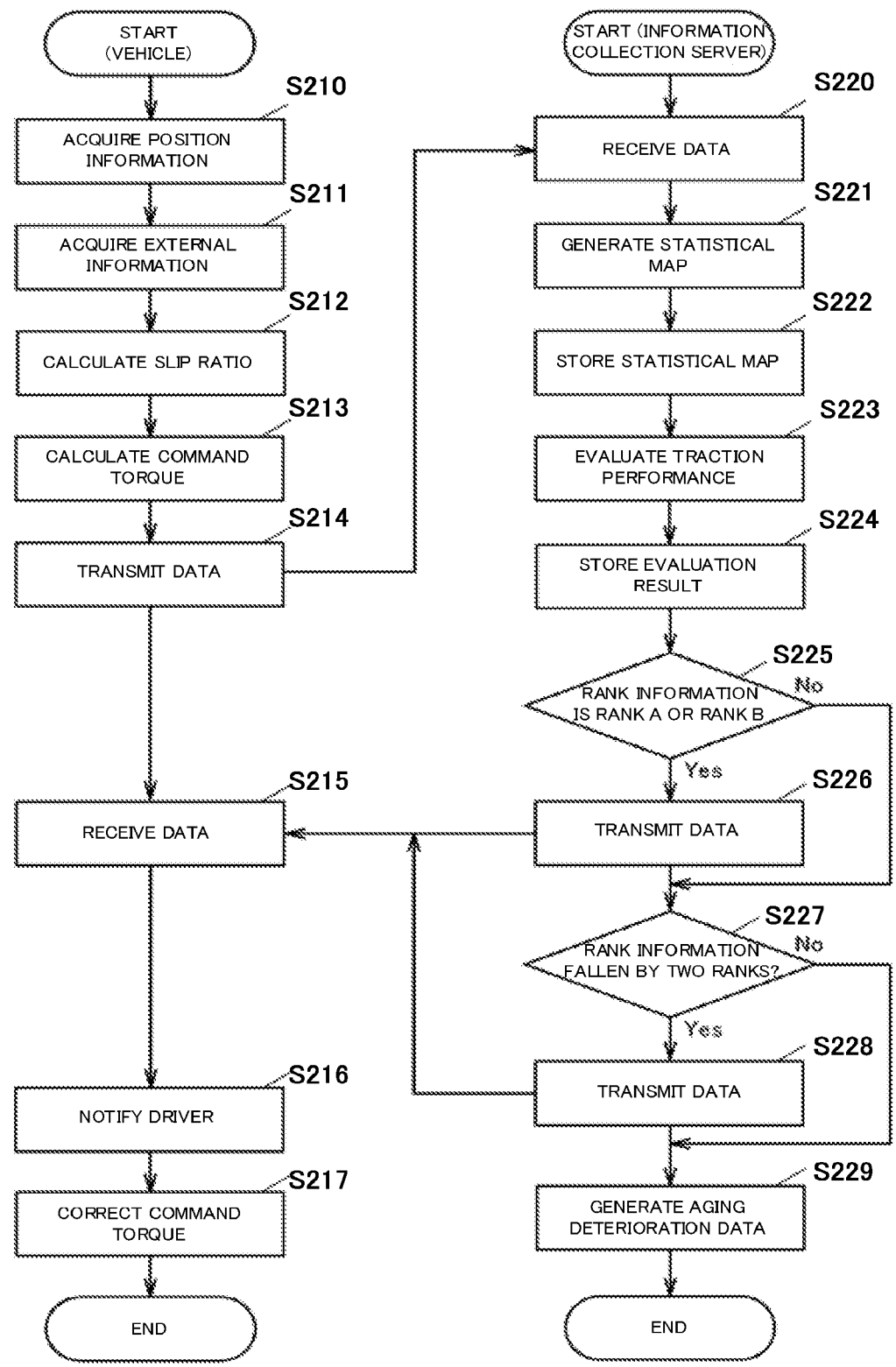
FIG. 22 is a flow chart of operations performed by a control unit of the host vehicle and the information collection server shown in FIG. 13.

Next, processing performed by the system SYS201 according to the present embodiment will be described with reference to FIG. 22. FIG. 22 is a flow chart showing an example of processing performed by the control unit 231 of the control device 203 and the control unit 262 of the information collection server 206 in the host vehicle 201.

First, the control unit 231 acquires the position information indicating the current position of the host vehicle 201 generated by the position detection unit 243 (step S210), estimates the road surface condition (dry, wet, snow) based on the weather information acquired from the weather information server 281 of the external device 209, and estimates the road state based on the road information (paved or unpaved) acquired from the road information server 282 (step S211).

Next, the control unit 231 calculates the slip ratio and the command torque based on the traveling information indicating the traveling state of the host vehicle 201 acquired from the traveling information detection unit 242 (steps S212, S213), and transmits the calculated slip ratio and command torque, and vehicle information (the vehicle ID, the vehicle type, the vehicle speed, or the like) on the host vehicle 201 to the information collection server 206 of the external device 209 (step S214).

Next, the control unit 231 receives the rank information or the information indicating the progress of the deterioration from the information collection server 206 (step S215). Then, the control unit 231 notifies the driver of the caution information according to the rank information (step S216), and corrects the command torque according to the rank information (step S217). Thus, the control unit 231 of the host vehicle 201 ends its processing.

The control unit 262 of the information collection server 206 receives the collected data 260 from the host vehicle 201 and the plurality of other vehicles 205 (step S220), generates the statistical map 272 based on the collected data 260 (step S221), and stores the generated statistical map 272 in the storage unit 263 (step S222).

Next, the control unit 262 acquires the rank information of the host vehicle 201 based on the slip ratio and the command torque received from the control unit 231 of the host vehicle 201 in step S220 and the generated statistical map 272 (step S223). When the rank information is the rank A or rank B (step S225: Yes), the control unit 262 transmits the rank information to the control unit 231 of the host vehicle 201 (step S226). On the other hand, if the rank information is not rank A or rank B (step S225: No), the control unit 262 directly proceeds to step S227 in its processing.

In step S227, the control unit 262 determines whether the rank information has fallen by the two ranks (step S227). In this processing, the deterioration progress determination part 256 makes a determination based on a comparison between the rank information as the past evaluation result 273 and the rank information as the current evaluation result 273.

When determining that the rank information has fallen by two ranks (step S227: Yes), the control unit 262 transmits information indicating that the rank information decrease suddenly to the control unit 231 of the host vehicle 201 (step S228). On the other hand, when determining that the rank information has fallen by less than two ranks (step S227: No), the control unit 262 generates the aging deterioration data based on the data stored in the storage unit 263 (step S229), and ends its processing as it is.

(Operation and Effects of Embodiment)

According to the embodiment described above, the system SYS201 evaluates the traction performance based on the slip ratio calculated by the host vehicle 201 and the statistical map 272 as the reference slip ratio according to the external information such as the road surface condition and the road state, thus evaluating the traction performance in consideration of the external factor. This allows the system SYS201 to accurately grasp the traction performance of the host vehicle 201.

According to the present embodiment, the system SYS201 notifies the driver of the rank information for ranking the traction performance based on the statistical map 272 of the plurality of other vehicles 205 that are of the same vehicle type as the host vehicle 201 is and have traveled at the same position as the host vehicle 201 travels, thus providing objective information indicating the slipperiness of the tire to the driver. This helps the driver to drive safely and prevents an accident in advance.

Although only the control unit 231 of the host vehicle 201 among the host vehicle 201 and the plurality of other vehicles 205 has been described in the above embodiment, the plurality of other vehicles 205 may also include the control unit having the same configuration, and may evaluate the traction performance. In this case, the host vehicle 201 may be configured to detect information showing that the traction performance of any one of the plurality of other vehicles 205 is ranked as the rank A. This allows notifying the driver of the host vehicle 201 of the presence of a dangerous vehicle that is likely to slip around, thus preventing an accident in advance.

Further, even in the same vehicle type, the slipperiness of the vehicle varies due to the type of tire, the air pressure, deterioration of other parts, or the like, conventional driving force transmission devices, which control the command torque without consideration of those factors, have difficulty in grasping the traction performance accurately. In the present embodiment, the system SYS201 evaluates the traction performance based on objective data of the statistical map 272 generated form information of the plurality of other vehicles 205 that are of the same vehicle type as the host vehicle 201 is and travels the same environment as the host vehicle 201 travels (for example, traveling at the same position as the vehicle 201 and having the same road surface condition), thus accurately grasping the traction performance of the host vehicle 201 without considering the above factors in each vehicle.

In the embodiment described above, since the control unit 262 includes the deterioration progress determination part 256 that determines the progress of the deterioration in the traction performance, it is possible to grasp the degree of deterioration of the host vehicle 201 by comparing the past traction performance of the host vehicle 201 and the current traction performance of the host vehicle 201. As a result, an accident can be prevented in advance because the driver is promoted to drive safely or the driver is notified in advance of the time of repair. That is, safety is improved.

Here, the traction performance evaluation system SYS201 and the host vehicle 201 according to the embodiment described above may be briefly summarized in the following [1] to [13], respectively.

[1] A system for evaluating traction performance including:
an external information acquisition part configured to acquire external information on a disturbance factor that affects a condition of a road surface on which a target vehicle travels;
a slip ratio calculation part configured to calculate a slip ratio of a tire based on traveling information indicating a traveling state of the target vehicle; and
a traction performance evaluation part configured to evaluate a traction performance of the target vehicle based on a reference slip ratio corresponding to the external information and the slip ratio calculated by the slip ratio calculation part.

[2] The traction performance evaluation system according to [1],
wherein the traction performance evaluation part evaluates the traction performance based on slip ratios of tires of a plurality of vehicles of the same type as the target vehicle.

[3] The traction performance evaluation system according to [1],
wherein the traction performance evaluation part evaluates a tire state based on slip ratios of a plurality of vehicles of the same vehicle type as the target vehicle.

[4] The traction performance evaluation system according to any one of [1] to [3],
wherein the target vehicle is capable of communicating with an external device that collects traveling information from the plurality of vehicles, and the external device includes the traction performance evaluation part and transmits an evaluation result evaluated by the traction performance evaluation part to the target vehicle.

[5] The traction performance evaluation system according to any one of [1] to [3],
wherein the target vehicle includes the traction performance evaluation part.

[6] The traction performance evaluation system according to [1],
wherein the external information includes at least one of weather information and road information.

[7] The traction performance evaluation system according to any one of [1] to [6], further including:
a notification part configured to notify a driver of the target vehicle of the evaluation result evaluated by the traction performance evaluation part.

[8] The traction performance evaluation system according to [1], further including:
a storage part configured to store the evaluation result evaluated by the traction performance evaluation part; and
a deterioration progress determination part configured to compare a current evaluation result evaluated by the traction performance evaluation part with a past evaluation result stored in the storage part, and determine progress of deterioration in the traction performance of the target vehicle based on a compared result.

[9] The traction performance evaluation system according to [8], further including:
a notification part that notifies a driver of the target vehicle when the deterioration progress determination part determines that a rank information has decreased within a predetermined time, the evaluation result evaluated by the traction performance evaluation part being the rank information ranked according to the traction performance of the target vehicle.

[10] The traction performance evaluation system according to [8] or [9],
wherein the target vehicle is capable of communicating with an external device that collects traveling information from a plurality of vehicles, the external device includes the deterioration progress determination part, and the deterioration progress determination part transmits information indicating the progress of the deterioration determined based on the evaluation result evaluated by the traction performance evaluation part for the plurality of vehicles to the target vehicle.

[11] The traction performance evaluation system according to any one of [8] to [10],
wherein the deterioration progress determination part determines the progress of the deterioration in the traction performance based on the evaluation results of the plurality of vehicles of the same vehicle type as the target vehicle.

[12] The traction performance evaluation system according to [8] or [9],
wherein the target vehicle includes the deterioration progress determination part.

[13] A four-wheel drive vehicle including:
a main driving wheel to which a driving force of a driving source is constantly transmitted;
an auxiliary driving wheel to which the driving force of the driving source is transmitted according to a vehicle state;
a driving force transmission device interposed in a driving force transmission path to the auxiliary driving wheel; and
a control device configured to control the driving force transmission device according to the vehicle state,
wherein the control device is configured to acquire an evaluation result of the traction performance evaluation part in the traction performance evaluation system according to any one of [1] to [12], and control the driving force transmission device based on the evaluation result.

APPENDIX

Although the embodiments of the present disclosure have been described above, these embodiments do not limit the invention according to the claims. It should also be noted that not all combinations of the characteristics described in the embodiments are essential to the means for solving the problem of the invention.

Although the control units 3, 103, 231 of the host vehicles 1, 101, 201 among the host vehicles 1, 101, 201 and the plurality of other vehicles 5, 105, 205 has been described in the embodiments described above, the plurality of other vehicles 5, 105, 205 also include the control unit having the same configuration to determine the tire state. In this case, when there is a vehicle whose rank information is the rank A or rank B among the plurality of other vehicles 5, 105, 205, the host vehicles 1, 101, 201 may be configured to detect this information. As a result, an accident can be prevented in advance by notifying the drivers of the host vehicles 1, 101, 201 of the presence of a dangerous vehicle that is likely to slip around.

In the embodiments described above, although the control units 3, 103 of the host vehicle 1, 101 have determined the rank information by the tire state evaluation part 37, 138, the control units 62, 162 of the information collection servers 6, 106 may determine the rank information. In this case, the transmission part 55, 155 of the control units 62, 162 of the information collection servers 6, 106 transmits only the rank information to the host vehicles 1, 101, and the notification part 38, 139 of the control units 3, 103 of the host vehicles 1, 101 notify the driver of the caution information based on the received rank information. In the embodiment described above, although the control unit 262 of the information collection server 206 determines the rank information by the traction performance evaluation part 254, the control unit 231 of the host vehicle 201 may determine the rank information. In addition, in the embodiment described above, the control unit 262 of the information collection server 206 detects a sudden change in the rank information by the deterioration progress determination part 256, but the control unit 231 of the host vehicle 201 may detect the sudden change in the rank information. That is, the traction performance evaluation part 254 and the deterioration progress determination part 256 may be mounted on the control unit 231 of the control device 203 of the host vehicle 201, or may be mounted on the control unit 262 of the information collection server 206.

Also, in the present disclosure, the information collection servers 6, 106, 206 of the external devices 9, 109, 209 are not essential components. That is, in the embodiments described above, the information collection servers 6, 106 of the external devices 9, 109 generate the statistical maps 72, 172 based on the collected data 60, 160, but the host vehicles 1, 101 may receive the collected data 60, 160 from the plurality of other vehicles 5, 105 and generate the statistical maps 72, 172. In addition, in the embodiment described above, the information collection server 206 of the external device 209 generates the statistical map 272 based on the collected data 260, and evaluates the traction performance and determines the progress of the deterioration based on the statistical map 272, but all of the processing may be performed by the control unit 231 of the host vehicle 201.

In the embodiments described above, the statistical maps 72, 172 has two threshold values of the first threshold value $S_1$ and the second threshold value $S_2$, the statistical map 272 has four threshold values of the first threshold value $S_1$ to the fourth threshold value $S_4$, but the number of threshold values is not limited to this, and the number of threshold values may be three or six, for example.

In the embodiments described above, the control units 3, 103 acquire the traveling information from the traveling information detection units 23, 123 configured by a plurality of sensors, but the control units 3, 103 may acquire parameters related to the traveling state from another control device, not shown, included in the host vehicles 1, 101 via the in-vehicle network. In addition, although the control device 203 acquires various sensor detection values, may obtain a calculation value calculated by another control device, not shown, of the host vehicle 201 via the in-vehicle network such as a CAN.

What is claimed is:

1. A system for predicting a friction coefficient, comprising:
    an external information acquisition part configured to acquire external information on a disturbance factor that affects a condition of a road surface on which a target vehicle travels;
    a tire information acquisition part configured to acquire tire information indicating a condition of a tire of the target vehicle; and
    a friction coefficient prediction part configured to predict the friction coefficient between the tire and the road surface based on the tire information acquired by the tire information acquisition part and the external information acquired by the external information acquisition part,
    wherein the friction coefficient prediction part predicts the friction coefficient of the road surface ahead of the target vehicle in a traveling direction, and
    wherein the friction coefficient prediction part predicts the friction coefficient of the road surface at a stop position of the target vehicle based on the external information acquired immediately before start of the target vehicle.

2. The system according to claim 1,
    wherein the external information includes at least one of weather information and road information.

3. The system according to claim 1,
    wherein the tire information acquisition part acquires the tire information based on friction coefficients between tires of a plurality of preceding vehicles and road surfaces.

* * * * *